(12) United States Patent
Rhee et al.

(10) Patent No.: US 9,785,155 B2
(45) Date of Patent: Oct. 10, 2017

(54) SYSTEMS AND METHODS UTILIZING A WIRELESS MESH NETWORK

(75) Inventors: Sokwoo Rhee, Lexington, MA (US); Sheng Liu, Cambridge, MA (US); Martin Hanssmann, Portsmouth, NH (US); David Hirst, Chelmsford, MA (US); Tairin Hahn, Chelmsford, MA (US); Mark D. O'Hearne, Newton, MA (US); Lynne Thomas, Ayer, MA (US)

(73) Assignee: Millennial Net, Inc., Chelmsford, MA (US)

( * ) Notice: Subject to any disclaimer, the term of this patent is extended or adjusted under 35 U.S.C. 154(b) by 1223 days.

(21) Appl. No.: 13/522,698

(22) PCT Filed: Jan. 18, 2011

(86) PCT No.: PCT/US2011/021541
§ 371 (c)(1),
(2), (4) Date: Dec. 6, 2012

(87) PCT Pub. No.: WO2011/090938
PCT Pub. Date: Jul. 28, 2011

(65) Prior Publication Data
US 2013/0075484 A1 Mar. 28, 2013

Related U.S. Application Data

(60) Provisional application No. 61/296,173, filed on Jan. 19, 2010.

(51) Int. Cl.
*F23L 11/02* (2006.01)
*G05D 23/00* (2006.01)
*G01R 31/08* (2006.01)
*F17D 1/16* (2006.01)
*G05D 23/185* (2006.01)
*G01D 4/00* (2006.01)
(Continued)

(52) U.S. Cl.
CPC ........... *G05D 23/185* (2013.01); *G01D 4/004* (2013.01); *G05D 16/2066* (2013.01); *H04W 24/00* (2013.01); *H04W 48/18* (2013.01); *Y02B 90/242* (2013.01); *Y02B 90/246* (2013.01); *Y04S 20/322* (2013.01); *Y04S 20/42* (2013.01); *Y10T 137/0396* (2015.04)

(58) Field of Classification Search
CPC .. G01D 4/004; G05D 16/2066; G05D 23/185; H04W 24/00; H04W 48/18
USPC ........................ 236/1 F, 51; 137/14; 370/352
See application file for complete search history.

(56) References Cited

U.S. PATENT DOCUMENTS 3,604,625 A * 9/1971 Waeldner ................. F24F 11/04
137/607
4,634,047 A * 1/1987 Dean ...................... F24F 11/053
137/86
(Continued)

*Primary Examiner* — Henry Crenshaw
(74) *Attorney, Agent, or Firm* — Burns & Levinson LLP; Joseph M. Maraia

(57) ABSTRACT

In some examples, a wireless controller is utilized within a wireless mesh network. The wireless controller includes a control module configured to manage at least one energy device via a pneumatic pressure line based on one or more parts of an energy profile; and a network interface module configured to transmit energy data to a management server and receive the one or more parts of the energy profile from the management server.

17 Claims, 40 Drawing Sheets

(51) Int. Cl.
    *G05D 16/20*                         (2006.01)
    *H04W 24/00*                     (2009.01)
    *H04W 48/18*                     (2009.01)

(56) References Cited

U.S. PATENT DOCUMENTS

| | | | | |
|---|---|---|---|---|
| 4,994,781 | A * | 2/1991 | Sahagen | G01L 9/0055 338/2 |
| 5,634,590 | A * | 6/1997 | Gorski | G05D 23/1917 236/47 |
| 6,519,509 | B1 * | 2/2003 | Nierlich | H02J 3/008 700/286 |
| 6,628,522 | B2 * | 9/2003 | Trautman | F28F 13/02 165/185 |
| 7,905,722 | B1 * | 3/2011 | Heath | B01D 53/002 236/11 |
| 2001/0007265 | A1 * | 7/2001 | Itzhaky | F16K 31/004 137/883 |
| 2004/0151583 | A1 * | 8/2004 | Bettencourt, Jr. | F04D 27/002 416/1 |
| 2007/0099189 | A1 * | 5/2007 | Gomez-Elvira Rodriguez | G01N 1/31 435/6.19 |
| 2007/0284293 | A1 | 12/2007 | Pitchford et al. | |
| 2008/0183424 | A1 * | 7/2008 | Seem | G05B 23/024 702/181 |
| 2008/0319585 | A1 | 12/2008 | Nickerson et al. | |
| 2009/0082888 | A1 | 3/2009 | Johansen | |
| 2009/0140060 | A1 * | 6/2009 | Stoner | G05D 23/1934 236/51 |
| 2009/0171512 | A1 * | 7/2009 | Duncan | F24F 5/0035 700/300 |
| 2009/0302996 | A1 | 12/2009 | Rhee et al. | |
| 2010/0070091 | A1 * | 3/2010 | Watson | G06Q 50/06 700/278 |
| 2011/0139271 | A1 * | 6/2011 | Hirata | G05D 7/0635 137/487.5 |
| 2011/0153090 | A1 * | 6/2011 | Besore | G05B 15/02 700/278 |
| 2011/0166712 | A1 * | 7/2011 | Kramer | G05D 23/1919 700/278 |
| 2011/0238223 | A1 * | 9/2011 | Narayanamurthy | F24F 5/0046 700/277 |
| 2012/0123594 | A1 * | 5/2012 | Finch | G05B 15/02 700/278 |
| 2013/0075484 | A1 * | 3/2013 | Rhee | G01D 4/004 236/1 F |

\* cited by examiner

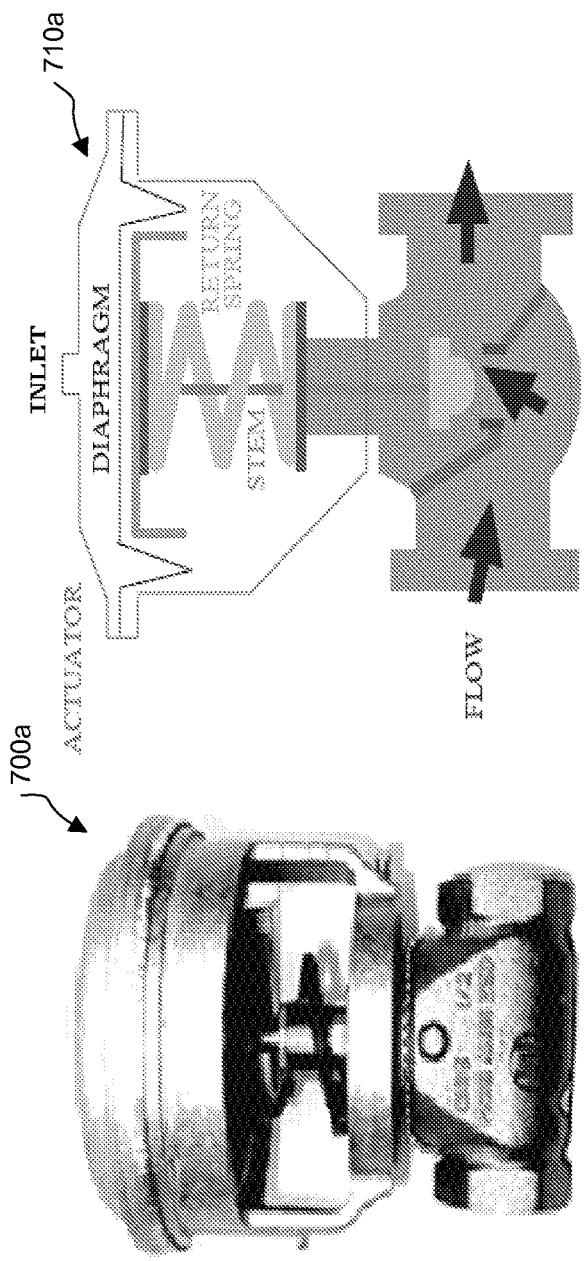
FIG. 7A
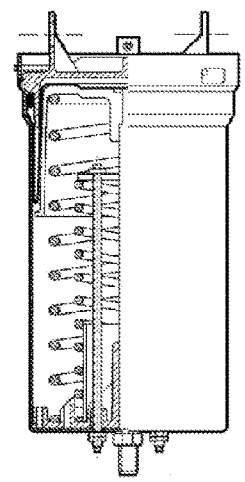
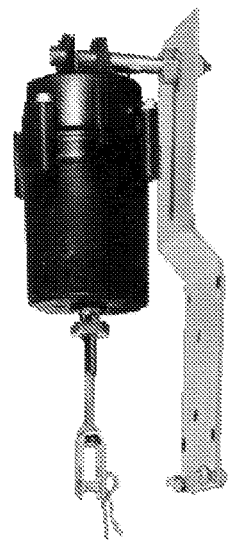
Hesitation Actuator.
FIG. 7B

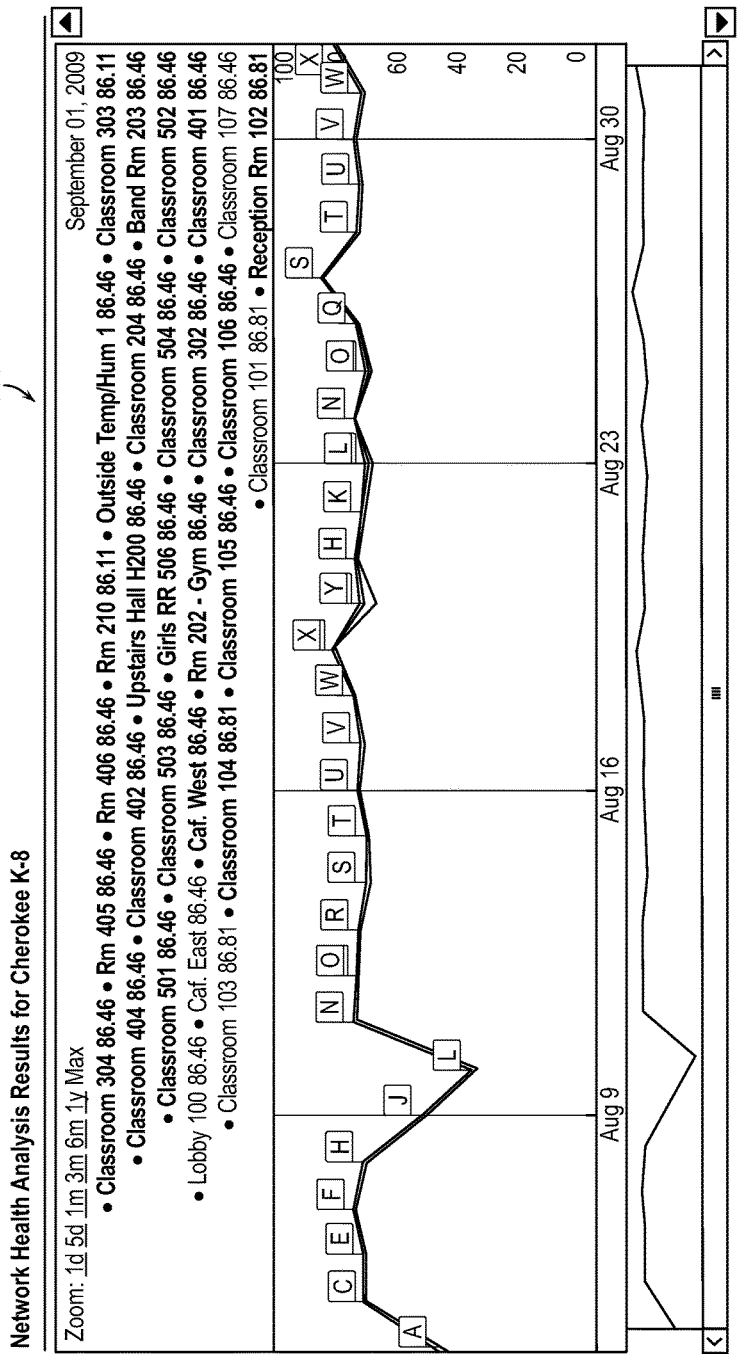

◀ X. LOST 15MINs + LOST 15MINs + LOST 15MINs + LOST 15MINs + LOST 15MINs + LOST 15MINs + LOST 15MINs + LOST 15MINs + SITE DOWN + LOST 15MINs + LOST 15MINs + LOST 15MINs :from 09/01 00:59 to 09/01 01:15 + site down from 09/01 01:59 to 09/01 02:15 + site down from 09/01 02:59 to 09/01 03:15 + site down from 09/01 04:59 to 09/01 05:15 + site down from 09/01 05:59 to 09/01 06:15 + site down from 09/01 06:59 to 09/01 07:15 + site down from 09/01 08:59 to 09/01 09:15 + site down from 9:01 09:59 to 09/01 10:15 + site down from 09/01 10:54 to 09/01 11:15 + site down from 09/01 12:59 to 09/01 13:15 + site down from 09/01 13:59 to 09/01 14:15 + site down from 09/01 14:59 to 09/01 15:15
2009-9-1
W. LOST 15MINs + LOST 15MINs + LOST 15MINs + LOST 15MINs + LOST 15MINs + SITE DOWN + SITE DOWN + LOST 15MINs + LOST 15MINs + LOST
▶

1000c

I. Add New device :Rm. 209 Dorm. @11:39
2009-7-1
H. Add New device :Rm. 215 @10:54
2009-7-1
G. Add New device :Rm. 202 Rec. Rm. @ 09:54
2009-7-1
F. Add New device :Hall 101 1st Floor @ 09:29
2009-7-1
E. Add New device :Rm. 111 @09:49
2009-7-1
D. SITE DOWN :from 06/26 17:10 to 06/26 17:38
2009-6-26
C. LOST 15MINs+ LOST 15MINs+ LOST 15MINs :from 06/24 05:06 to 06/24 05:24+ site down from 06/24 06:11 to 06/24 06:26 + site down from 06/24 10:11 to 06/24 10:26
2009-6-24
B. LOST 15MINs :from 06/10 10:08 to 06/10 10:23
2009-6-10

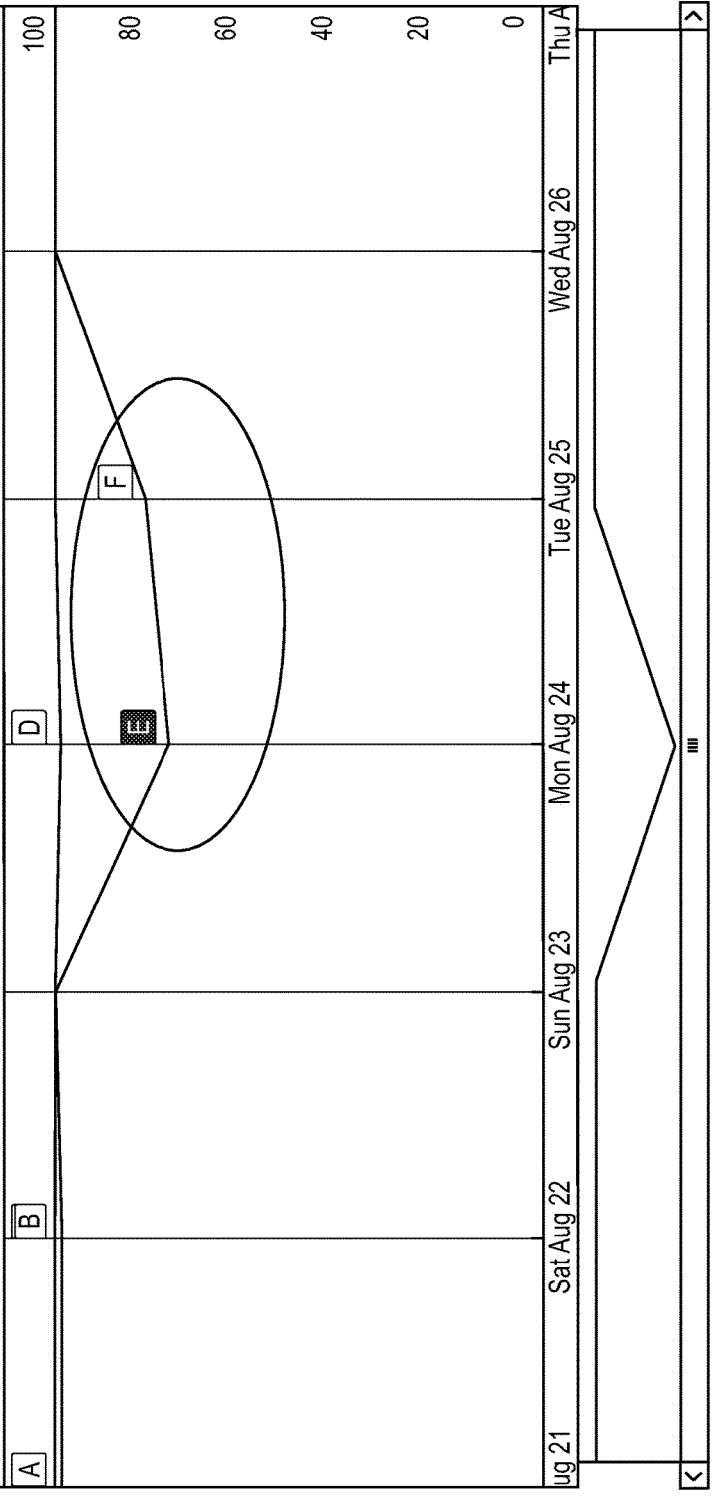

Possible Route Reconstruction for Festo Canada 1000e

| Name | Latest RSSI | # of link recovery | link recovery/mon. | # of parents | Latest update at |
|---|---|---|---|---|---|
| 009 Production Department | -23 | 0 | 0 | 0 | 2009-08-21 16:43:49 |
| 010 Didactic Department | -44 | 2 | 30 | 2 | 2009-08-24 13:30:56 |
| 011 Sales Department | -12 | 0 | 0 | 0 | 2009-08-21 16:43:49 |
| 012 Atrium | 4 | 0 | 0 | 0 | 2009-08-21 16:43:50 |
| 013 Assembly Department | -18 | 0 | 0 | 0 | 2009-08-21 16:43:50 |
| 014 Biocomfort Office | 19 | 0 | 0 | 0 | 2009-08-21 16:43:50 |
| 202 WiZone 1 | -40 | 0 | 0 | 0 | 2009-08-22 19:01:16 |
| 223 WiRouter 1 | | | | | |
| 247 Wi-SITE | | | | | |

FIG. 10F-2

| Name | Lastest RSSI | # of link recovery | link recovery/mon. | # of parents | Lastest update at |
|---|---|---|---|---|---|
| 247 Wi-SITE | | | | | |
| 001 Classroom 101 | -10 | 929 | 40.27 | 26 | 2009-08-31 09:33:02 |
| 002 Reception Rm. 102 | -38 | 994 | 43.09 | 20 | 2009-08-27 20:16:24 |
| 003 Classroom 103 | -30 | 557 | 24.15 | 20 | 2009-08-27 20:16:24 |
| 004 Classroom 104 | -44 | 439 | 19.03 | 23 | 2009-08-28 12:03:42 |
| 005 Classroom 105 | -32 | 793 | 34.38 | 28 | 2009-08-28 01:58:30 |
| 006 Classroom 106 | -35 | 607 | 26.32 | 23 | 2009-08-28 12:03:43 |
| 007 Classroom 107 | -40 | 464 | 20.12 | 19 | 2009-09-01 14:34:36 |
| 008 Lobby 100 | -34 | 958 | 41.53 | 21 | 2009-09-01 06:59:28 |
| 009 Caf. East | -30 | 1157 | 50.16 | 36 | 2009-09-01 11:29:33 |
| 010 Caf. West | -38 | 1254 | 54.36 | 35 | 2009-09-01 18:24:41 |
| 011 Rm 202 - Gym | -39 | 791 | 34.29 | 23 | 2009-08-27 20:16:26 |
| 012 Classroom 302 | -30 | 793 | 34.38 | 22 | 2009-08-27 20:16:26 |
| 013 Classroom 401 | -26 | 1931 | 83.71 | 21 | 2009-09-02 05:15:54 |
| 014 Classroom 501 | -48 | 1543 | 66.89 | 21 | 2009-09-02 04:23:53 |
| 015 Classroom 503 | -43 | 1562 | 67.72 | 22 | 2009-09-02 04:50:54 |
| 016 Girls RR 506 | -40 | 803 | 34.81 | 18 | 2009-09-02 04:28:53 |
| 017 Classroom 504 | -23 | 1708 | 74.05 | 22 | 2009-09-02 04:52:54 |
| 018 Classroom 502 | -35 | 1544 | 66.94 | 20 | 2009-09-02 04:52:54 |
| 019 Classroom 404 | 4 | 1676 | 72.66 | 16 | 2009-09-02 05:18:55 |
| 020 Classroom 402 | -21 | 1647 | 71.4 | 17 | 2009-09-02 05:00:54 |
| 021 Upstairs Hall H200 | -24 | 1421 | 61.6 | 33 | 2009-08-31 11:34:07 |

FIG. 10F-4

| Name | Lastest RSSI | # of link recovery | link recovery/mon. | # of parents | Lastest update at |
|---|---|---|---|---|---|
| 022 Classroom 204 | -34 | 1396 | 60.52 | 15 | 2009-09-01 14:41:38 |
| 023 Band Rm. 203 | -37 | 524 | 22.72 | 14 | 2009-09-01 08:17:31 |
| 024 Classroom 304 | -22 | 519 | 22.5 | 18 | 2009-09-02 05:30:55 |
| 101 Rm 405 | -27 | 208 | 9.02 | 28 | 2009-08-27 20:16:29 |
| 102 Rm 406 | -48 | 225 | 9.75 | 22 | 2009-08-27 20:16:29 |
| 103 Rm 210 | -36 | 965 | 44.2 | 22 | 2009-08-05 07:56:44 |
| 200 East Hallway H100 | -21 | 487 | 21.11 | 23 | 2009-08-27 20:16:45 |
| 199 Lobby 100 | -33 | 816 | 35.38 | 30 | 2009-09-01 14:41:51 |
| 196 Caf. East | 0 | 782 | 33.9 | 30 | 2009-09-02 06:02:06 |
| 188 Library 212 | -42 | 701 | 30.39 | 22 | 2009-08-27 20:16:41 |
| 187 Gym 202 West | -30 | 665 | 28.83 | 23 | 2009-09-01 16:11:49 |
| 190 Gym 202 North | -28 | 392 | 16.99 | 17 | 2009-08-27 20:16:43 |
| 193 Classroom 402 | -35 | 1803 | 78.16 | 35 | 2009-09-02 05:19:08 |
| 198 Classroom 401 | -21 | 808 | 35.03 | 18 | 2009-09-02 03:22:05 |
| 195 Hallway H400 Near BBR | -49 | 1561 | 67.67 | 22 | 2009-09-02 05:25:08 |
| 197 Hallway H500 Near 502 | -21 | 1072 | 46.47 | 33 | 2009-09-01 21:46:59 |
| 186 Hallway H500 Near 504 | -17 | 1071 | 46.43 | 27 | 2009-09-02 04:39:03 |
| 194 Upstairs Hallway H300 | -38 | 832 | 36.07 | 28 | 2009-08-30 03:03:43 |
| 192 Upstairs Hallway H200 | -37 | 810 | 35.12 | 24 | 2009-08-27 20:16:45 |
| 105 Outside Temp/Hum 1 | -35 | 63 | 2.73 | 11 | 2009-08-31 15:28:16 |
| 025 Classroom 303 | -41 | 1486 | 64.42 | 29 | 2009-09-02 05:12:55 |

Possible Route Reconstruction for Festo Canada

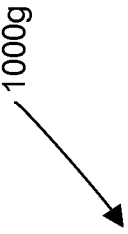
1000g

| Name | Current Route | at 20090825 20:05 | at 20090824 20:05 | at 20090823 20:05 |
|---|---|---|---|---|
| 247 WI-SITE | WI-SITE | WI-SITE | WI-SITE | WI-SITE |
| 014 Biocomfort Office | (2009-08-21 16:43:50) RSSI=19, Hop count=1 | (2009-08-21 16:43:50) RSSI=19, Hop count=1 | (2009-08-21 16:43:50) RSSI=19, Hop count=1 | (2009-08-21 16:43:50) RSSI=19, Hop count=1 |
| 013 Assembly Department | (2009-08-21 16:43:50) RSSI=-18, Hop count=2 | (2009-08-21 16:43:50) RSSI=-18, Hop count=2 | (2009-08-21 16:43:50) RSSI=-18, Hop count=2 | (2009-08-21 16:43:50) RSSI=-18, Hop count=2 |
| 012 Atrium | (2009-08-21 16:43:50) RSSI=-4, Hop count=1 | (2009-08-21 16:43:50) RSSI=-4, Hop count=1 | (2009-08-21 16:43:50) RSSI=-4, Hop count=1 | (2009-08-21 16:43:50) RSSI=-4, Hop count=1 |
| 011 Sales Department | (2009-08-21 16:43:49) RSSI=-12, Hop count=1 | (2009-08-21 16:43:49) RSSI=-12, Hop count=1 | (2009-08-21 16:43:49) RSSI=-12, Hop count=1 | (2009-08-21 16:43:49) RSSI=-12, Hop count=1 |
| 010 Didactic Department | (2009-09-02 15:49:37) RSSI=-36, Hop count=2 | (2009-08-24 13:30:56) RSSI=-44, Hop count=2 | (2009-08-24 13:30:56) RSSI=-44, Hop count=2 | (2009-08-21 16:43:49) RSSI=-34, Hop count=2 |
| 009 ... | (2009-08-21 16:43:49) RSSI=-23, Hop count=3 | (2009-08-21 16:43:49) RSSI=-23, Hop count=3 | (2009-08-21 16:43:49) RSSI=-23, Hop count=65535 @ 2009-08-24 18:35:00 | (2009-08-21 16:43:49) RSSI=-23, Hop count=3 |
| 202 WZone 1 | (2009-08-30 05:01:12) RSSI=-42, Hop count=2 | (2009-08-25 07:17:13) RSSI=-42, Hop count=2 | (2009-08-22 19:01:16) RSSI=-40, Hop count=2 | (2009-08-22 19:01:16) RSSI=-40, Hop count=2 |
| 223 WRouter 1 | Undefined | Undefined | Undefined | Undefined |

FIG. 10G

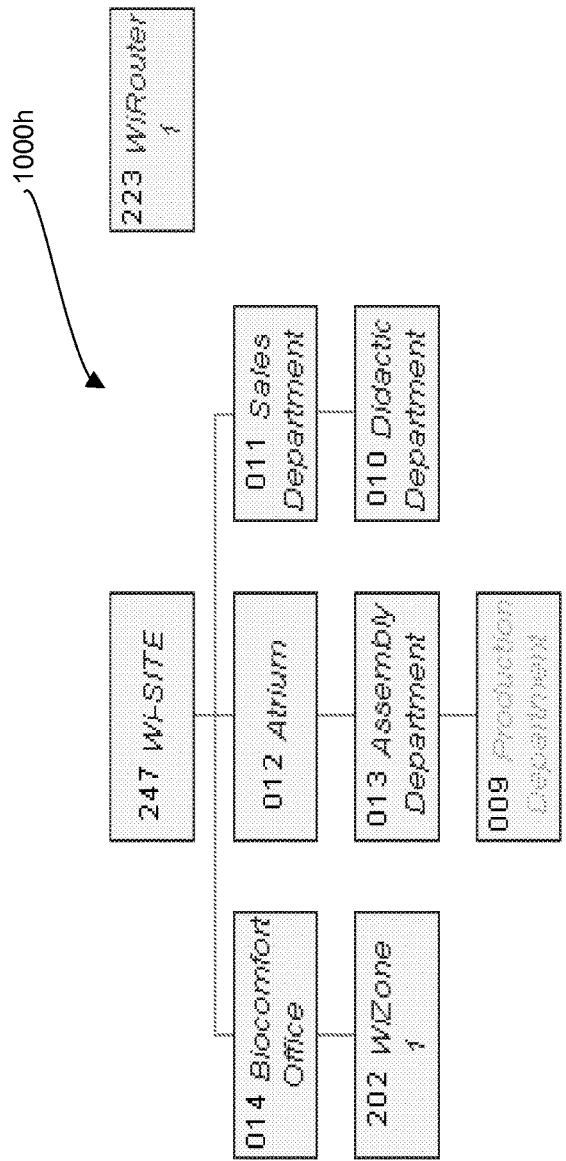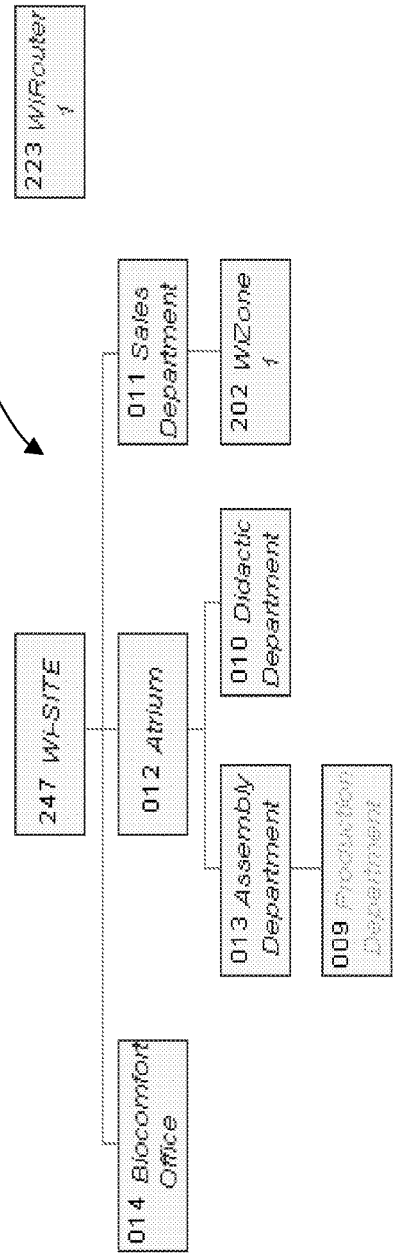
FIG. 10H
FIG. 10I

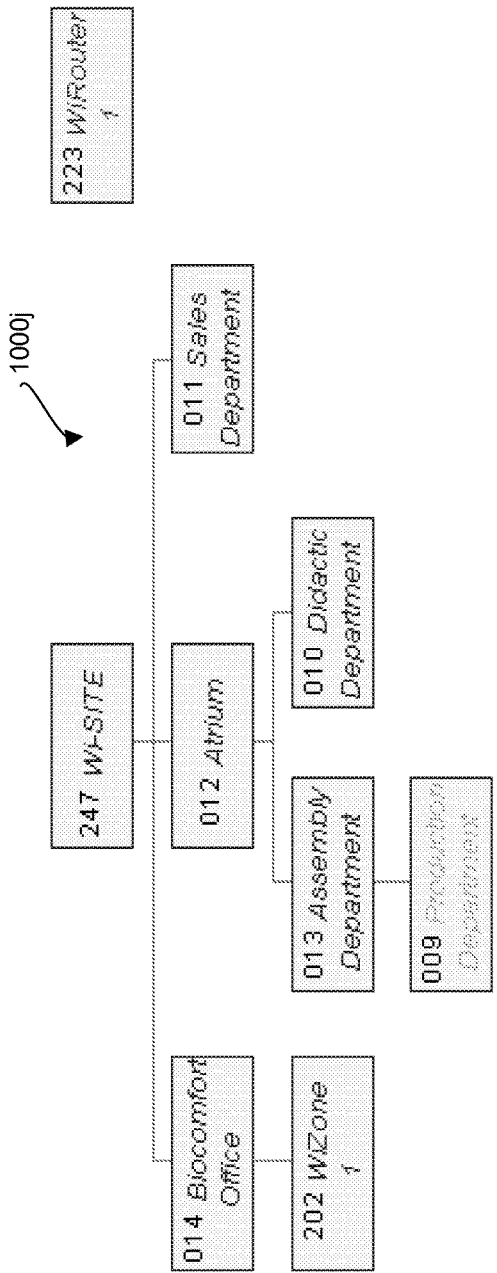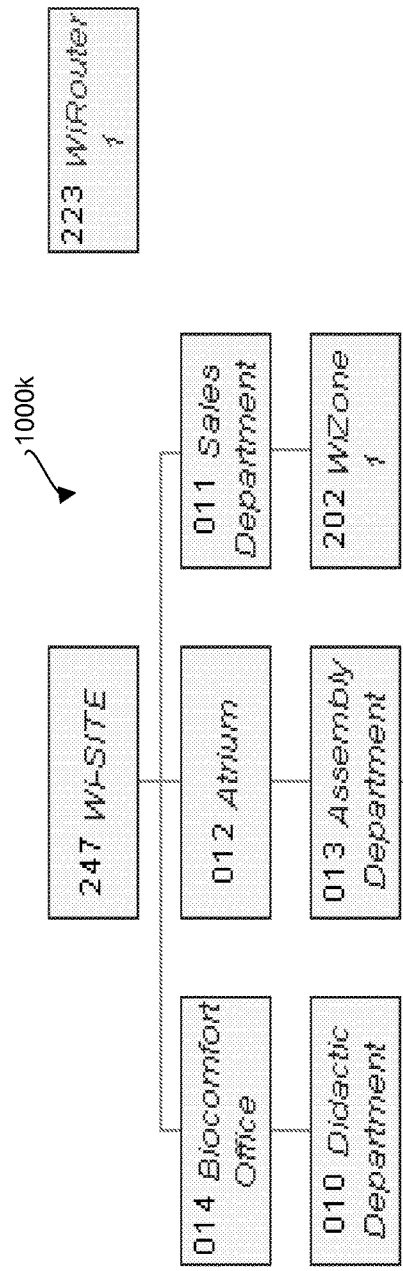
FIG. 10J
FIG. 10K

SYSTEMS AND METHODS UTILIZING A WIRELESS MESH NETWORK

RELATED APPLICATIONS

This application is the U.S. National Stage of International Application No. PCT/US2011/021541, filed on Jan. 18, 2011, published in English, which claims the benefit of U.S. Provisional Application No. 61/296,173, filed Jan. 19, 2010, the entire teachings of the above applications are incorporated herein by reference.

BACKGROUND

An ad hoc wireless network is a self-organizing network in which network devices themselves establish communication links with one another. Ad hoc wireless networks may be used in different settings. For example, an ad hoc wireless network may be established between monitoring and control devices and a host computer.

There are numerous issues involved in establishing and maintaining an ad hoc wireless network, not the least of which is power consumption. Network devices on an ad hoc wireless network typically run off of batteries, which must be checked and changed periodically. Changing batteries frequently can be inconvenient, particularly in cases where nodes of the wireless network include numerous small devices located in hard-to-reach areas.

Other issues relating to establishing and maintaining an ad hoc wireless network include, but are not limited to, delays in establishing the ad hoc wireless network, network traffic congestion resulting in poor data throughput, and data collisions caused by various devices trying to transmit data in (or around) a same time slot.

SUMMARY

One approach to utilizing a wireless mesh network is a wireless controller. The wireless controller includes a control module configured to manage at least one energy device via a pneumatic pressure line based on one or more parts of an energy profile; and a network interface module configured to transmit energy data to a management server and receive the one or more parts of the energy profile from the management server.

Another approach to utilizing a wireless mesh network is a wireless controller. The wireless controller includes a control module configured to active the wireless controller based on an activation request, the activation request associated with one or more priority data packets; and a network interface module configured to route and/or forward communication via a wireless mesh network.

Another approach to utilizing a wireless mesh network is a method for determining network health of a wireless mesh network. The method includes identifying a wireless device in the wireless mesh network; determining an actual number of data packets associated with the wireless device for a specified time period; determining an expected number of data packets associated with the wireless device for the specified time period; and generating a network health status based on the actual number of data packets and the expected number of data packets.

Another approach to utilizing a wireless mesh network is a method for reconstructing a data packet route for a wireless device. The method includes identifying a wireless device in a wireless mesh network; determining route information for the wireless device for a specified time period based on network data stored in a database, the route information associated with one or more data packets from and/or to the wireless device; and reconstructing the data packet route of the one or more data packets based on the route information.

Another approach to utilizing a wireless mesh network is a method for determining a weather impact on an energy model for a building. The method includes determining weather data associated with a geographical location of the building; generating missing weather data based on the weather data and/or weather data associated with one or more geographical locations near the building; and generating an energy model for the building based on the weather data, a current energy profile, and a projected energy profile.

Another approach to utilizing a wireless mesh network is a wireless controller. The wireless controller includes a sensor module configured to detect light data; a control module configured to generate location information based on the light data; and a network interface module configured to route and/or transmit the location information and/or the light data via a wireless mesh network.

Another approach to utilizing a wireless mesh network is a wireless controller. The wireless controller includes a sensor module configured to detect activation of a trap and/or presence of a pest; a control module configured to generate an alert based on the activation of the trap and/or the presence of the pest; and a network interface module configured to route and/or transmit the alert via a wireless mesh network.

In other examples, any of the approaches above can include one or more of the following features.

In some examples, the wireless controller further includes a pressure controller configured to modify a pressure in the pneumatic pressure line based on pressure feedback information, a thermal load in one or more controlled zones, and/or one or more parts of the energy profile.

In other examples, the wireless controller further includes the network interface module further configured to route and/or forward communication via a wireless mesh network.

In some examples, the wireless controller further includes the control module further configured to replace an existing pneumatic thermostat.

In other examples, the wireless controller further includes the wireless controller configured to enter a high duty cycle mode based on the activation by the control module.

In some examples, the wireless controller further includes the wireless controller further configured to enter a low duty cycle mode based on a de-activation by the control module.

In other examples, a computer program product, tangibly embodied in an information carrier, the computer program product including instructions being operable to cause a data processing apparatus to perform any one of the examples and/or approaches.

In some examples, a method includes one or more steps to perform any one of the examples and/or approaches.

In other examples, a system includes one or more processors and/or devices configured to perform any one of the examples and/or approaches.

In some examples, a management server includes one or more processors and/or modules configured to perform any one of the examples and/or approaches.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 7A illustrates an exemplary hesitation actuator valve and functional use of the valve.

FIG. 7B illustrates an exemplary hesitation actuator.

FIGS. 10E-10K illustrate route information.

DETAILED DESCRIPTION

Figure 1:
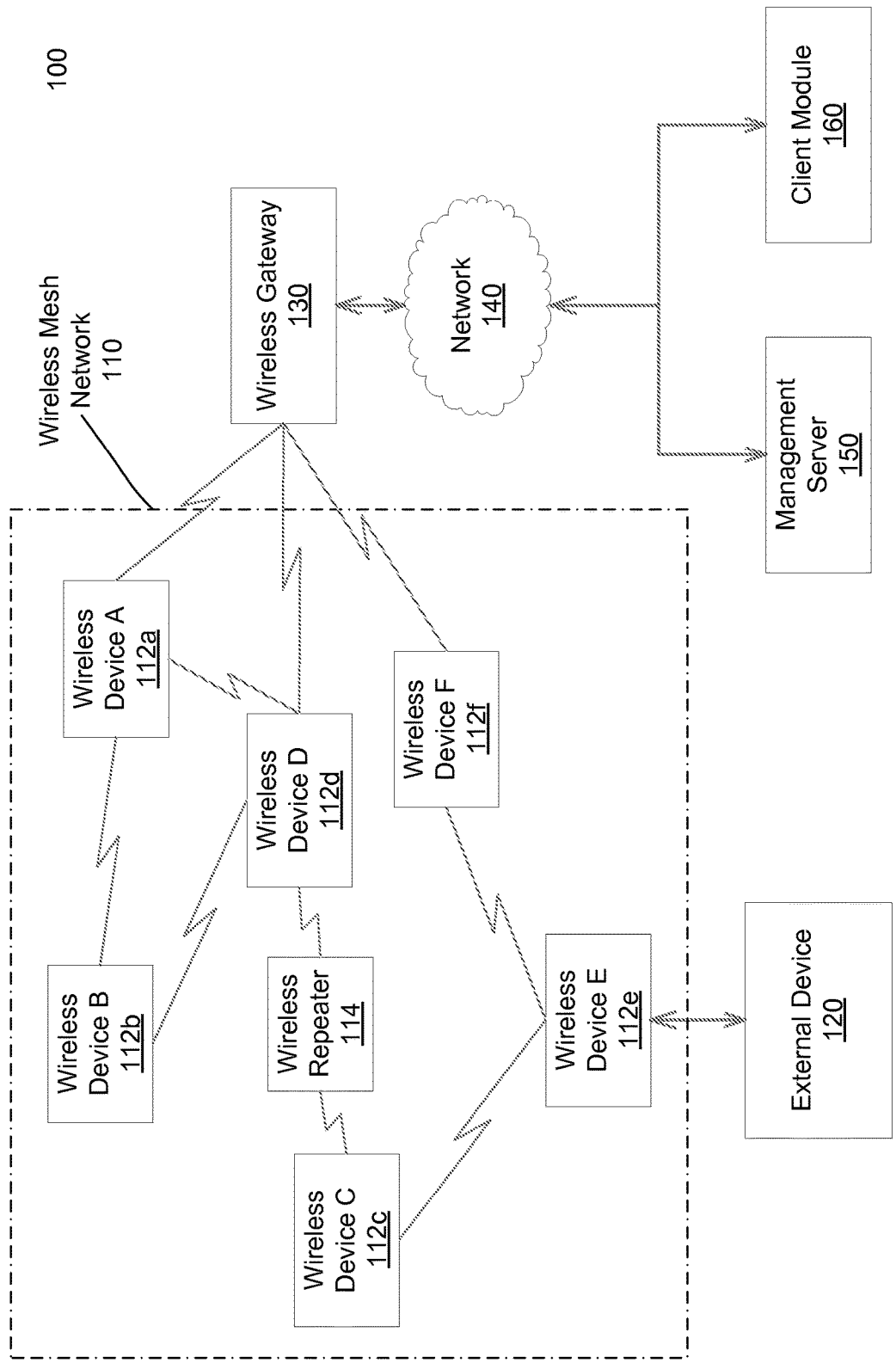
FIG. 1 illustrates an exemplary wireless mesh network.

FIG. 1 illustrates an exemplary wireless mesh environment 100. The wireless mesh environment 100 can be utilized for any of the techniques and/or examples described herein. The wireless mesh environment 100 includes a wireless mesh network 110, wireless devices 112a, 112b, 112c, 112d, 112e, and 112f (generally referred to as 112) that operate in the wireless mesh network 110, a wireless repeater 114, an external device 120, a wireless gateway 130, a network 140, a management server 150, and a client module 160. The wireless device 112e manages (e.g., controls, directs, monitors, etc.) the external device 120 (e.g., robot, sensor, control box, pneumatic device, etc.). The wireless repeater 114 forwards and/or routes communications between wireless device D 112d and wireless device C 112c via the wireless mesh network thereby extending the range of the wireless mesh network 110. The wireless gateway 130 connects the wireless mesh network 110 to the management server 150 via the network 140. The management server 150 communicates with the wireless devices 112 via the network 140 (e.g., the internet, local area network, etc.) and the wireless gateway 130 and transmits data to one or more of the wireless devices 112. The management server 150 also receives information from the wireless devices 112. The client module 160 includes an interface utilized to manage the management server 150 directly or remotely via the network 140.

Figure 2:
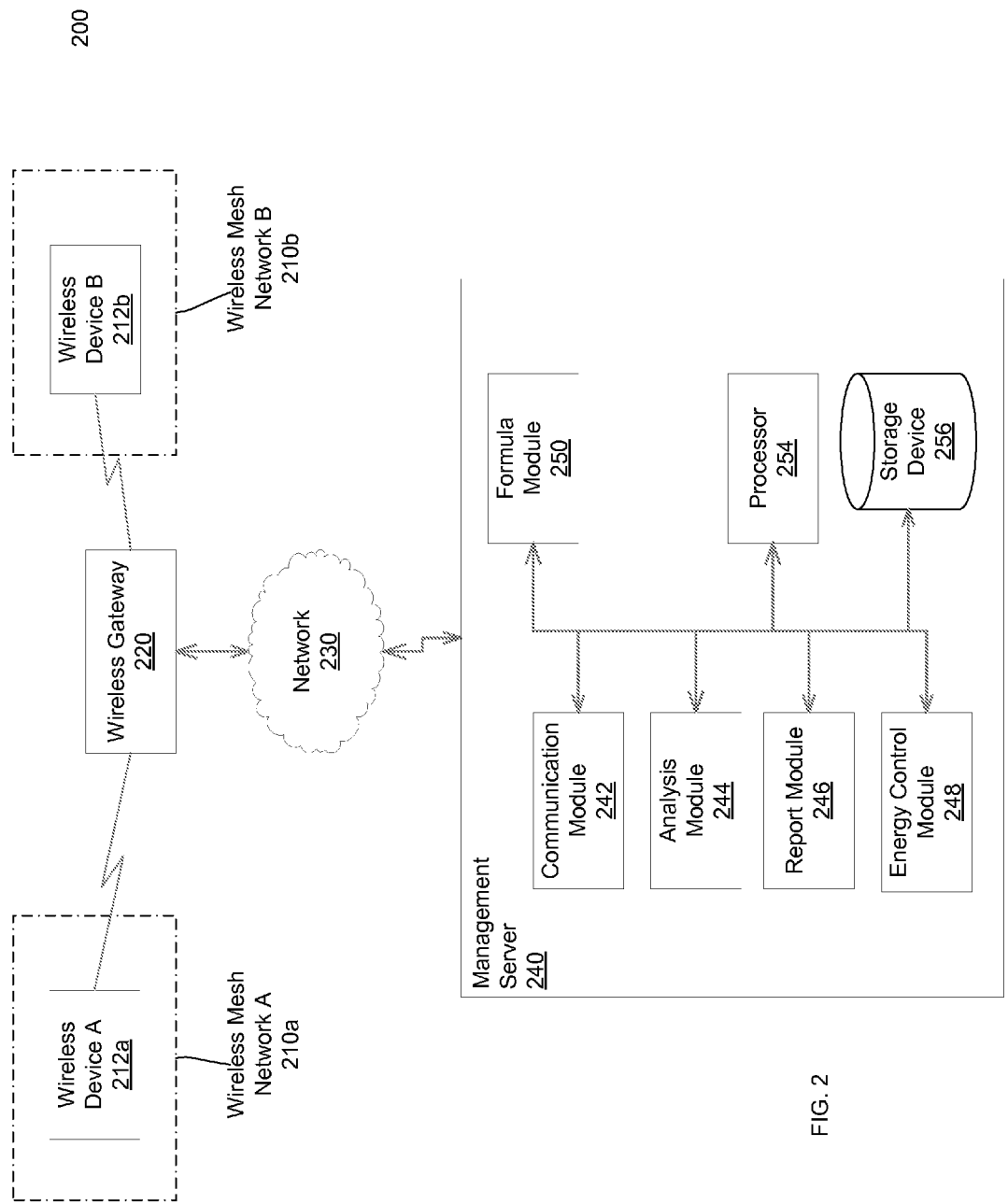
FIG. 2 illustrates an exemplary management server.

FIG. 2 illustrates an exemplary wireless mesh environment 200. The wireless mesh environment 200 includes wireless mesh networks A 210a and B 210b, a wireless gateway 220, a network 230, and a management server 240. A wireless device A 212a and B 212b operates in each of the wireless mesh networks A 210a and B 210b, respectively.

The management server 240 includes a communication module 242, an analysis module 244, a report module 246, an energy control module 248, a formula module 250, a processor 254, and a storage device 256. The management server 240 communicates via the network 230 to the wireless gateway 220. The communication module 242 monitors and receives data from the wireless devices A 212a and B 212b via the wireless gateway 220 and the network 230. The management server 240 can be utilized for any of the techniques and/or examples described herein. The modules, processor, and devices described within the management server 240 can perform any of the techniques described herein.

Figure 3:
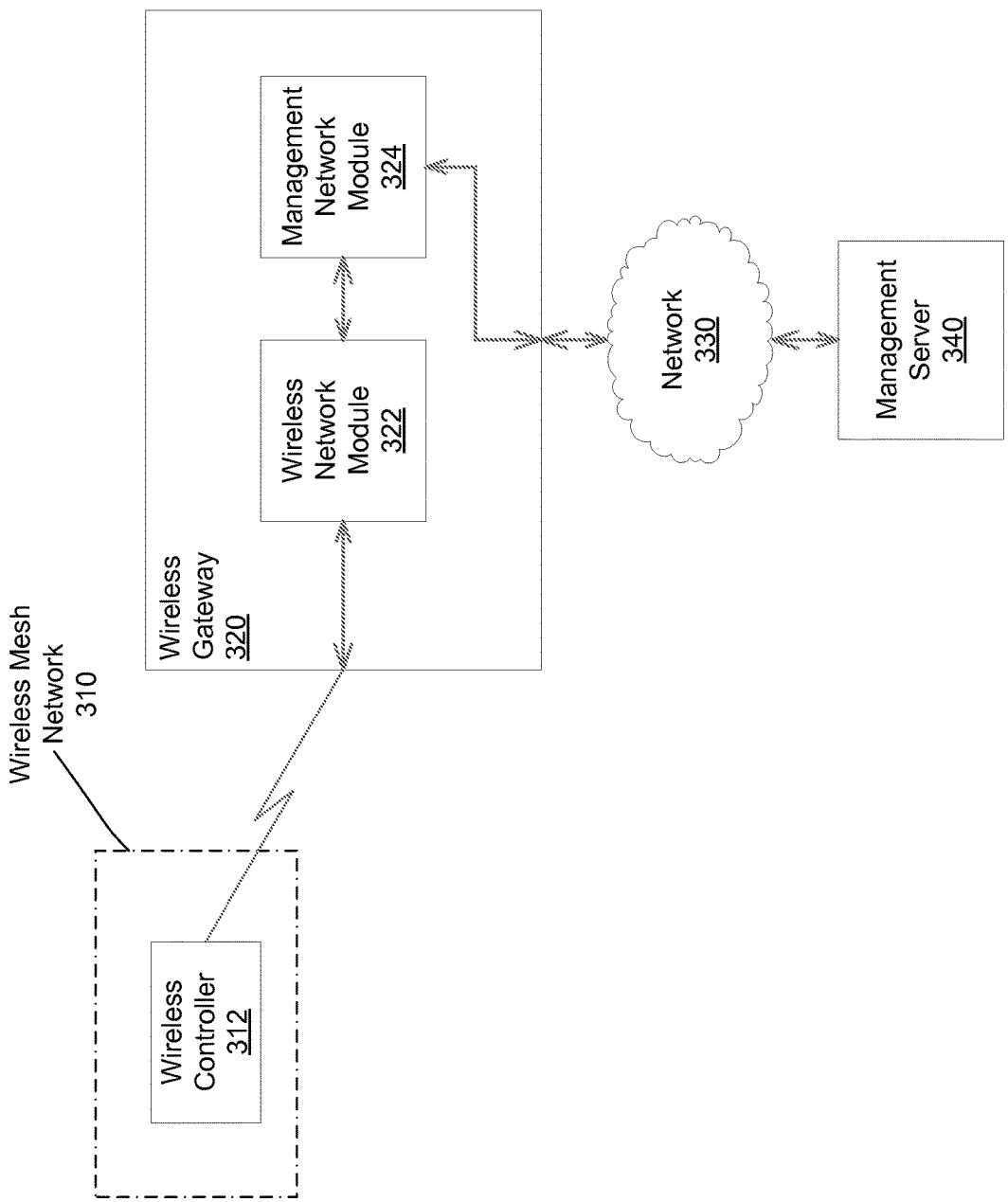
FIG. 3 illustrates an exemplary wireless gateway.
Figure 4:
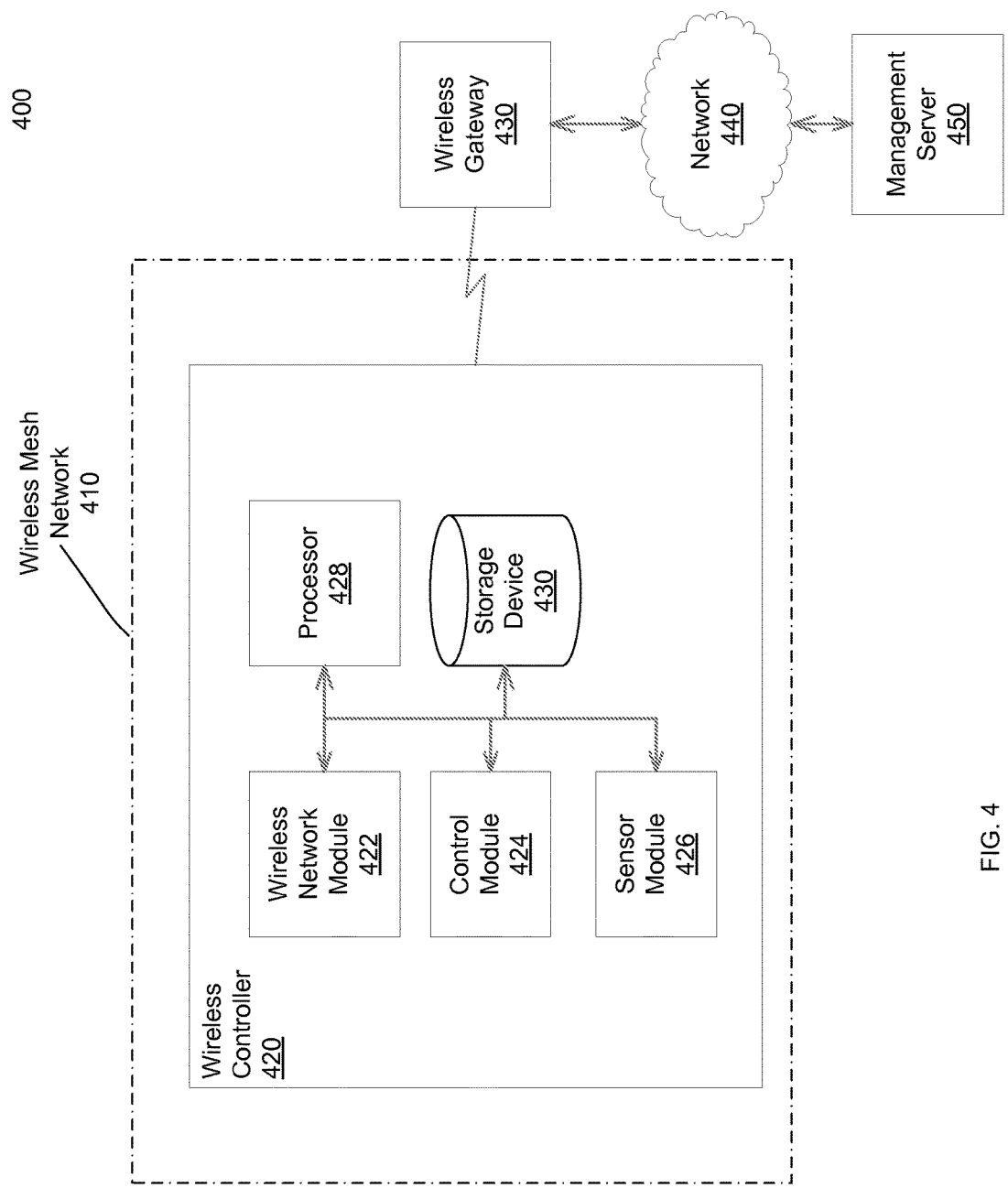
FIG. 4 illustrates an exemplary wireless controller for managing devices.

FIG. 3 illustrates an exemplary wireless mesh environment 300. The wireless mesh environment 300 includes a wireless mesh network 310, a wireless gateway 320, a network 330, and a management server 340. A wireless controller 312 operates in the wireless mesh network 310. The wireless gateway 320 provides for communication between the network 330 and the wireless mesh network 310 (e.g., protocol conversion, communication packet forwarding and/or routing, etc.). The wireless gateway 320 includes a wireless network module 322 and a management network module 324. The wireless gateway 320 can be utilized for any of the techniques and/or examples described herein. The modules, processor, and devices described within the wireless gateway 320 can perform any of the techniques described herein. FIG. 4 illustrates an exemplary wireless mesh environment 400. The wireless mesh environment 400 includes a wireless mesh network 410, a wireless gateway 430, a network 440, and a management server 450. A wireless controller 420 operates in the wireless mesh network 410 and manages devices (e.g., HVAC units, lights, hospital device, sensors, monitors, etc.). The wireless controller 420 can be utilized for any of the techniques and/or examples described herein. The wireless controller 420 includes a wireless network module 422, a control module 424, a sensor module 426, a processor 428, and a storage device 430. The modules, processor, and devices described within the wireless controller 420 can perform any of the techniques described herein.

The wireless mesh networks described herein can be, for example, utilized for various technologies. The technologies can, for example, include energy efficiency utilizing pressure information, light dimming control, network health monitoring, weather impact on building energy modeling, light detection sensors, and/or wireless pest control system. The technologies are discussed in turn below.

Energy Efficiency Utilizing Pressure Information

Figure 5:
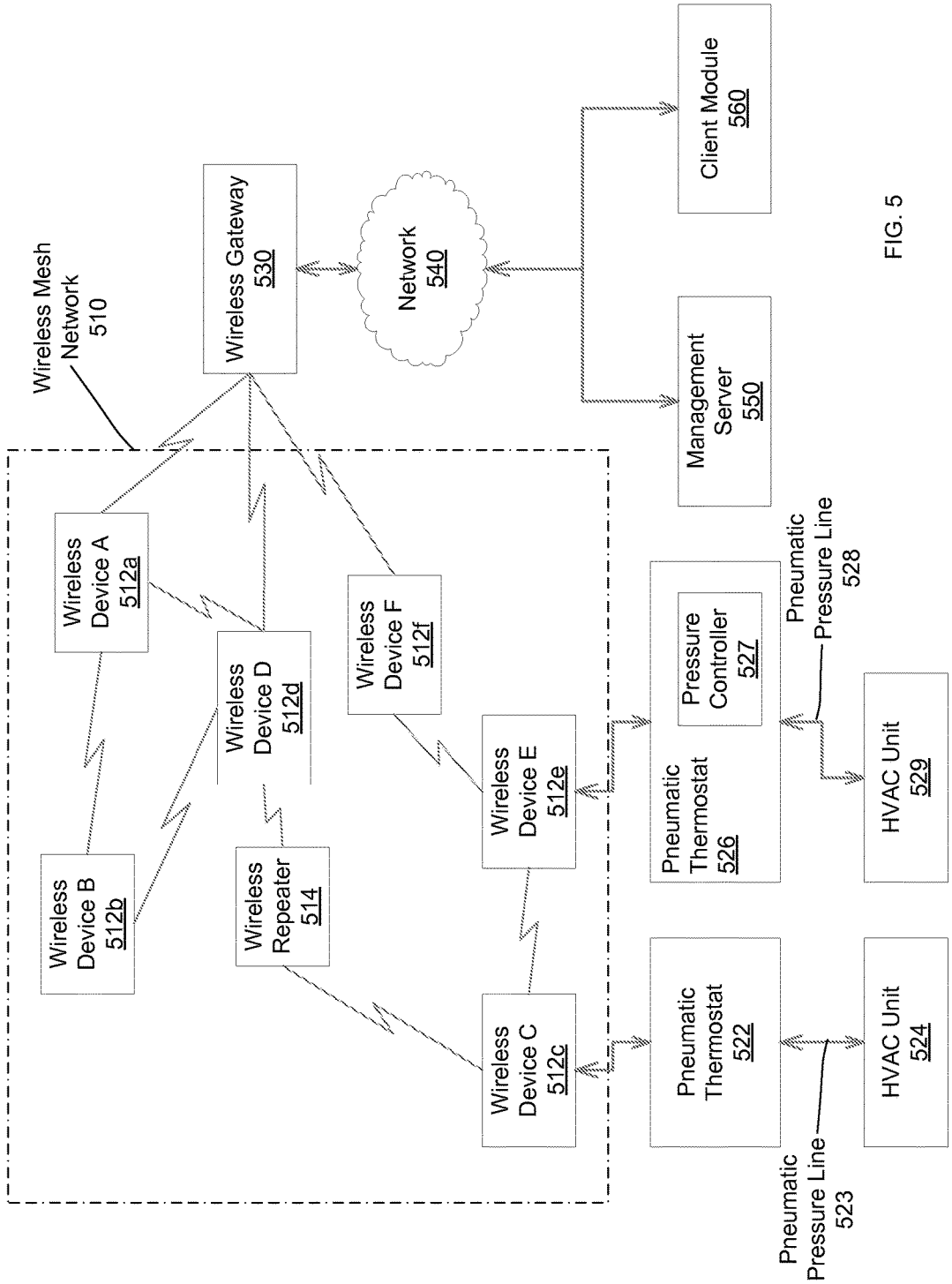
FIG. 5 illustrates an exemplary wireless mesh network for energy management utilizing pneumatic energy control units for managing devices.

The technology can utilize a wireless mesh network to manage devices via wireless pneumatic energy control units. FIG. 5 illustrates an exemplary wireless mesh environment 500 for energy management utilizing pneumatic energy control units for managing devices. The wireless mesh environment 500 includes a wireless mesh network 510, wireless devices 512a, 512b, 512c, 512d, 512e, and 512f (generally referred to as 512) that operate in the wireless mesh network 510, a wireless repeater 514, a wireless gateway 530, a network 540, a management server 550, and a client module 560. The wireless repeater 514 forwards and/or routes communications between wireless device D 512*d* and wireless device C 512*c* via the wireless mesh network thereby extending the range of the wireless mesh network 510. The wireless gateway 530 connects the wireless mesh network 510 to the management server 550 via the network 540. The management server 550 communicates with the wireless devices 512 via the network 540 (e.g., the internet, local area network, etc.) and the wireless gateway 530 and transmits data to one or more of the wireless devices 512. The management server 550 also receives information from the wireless devices 512. The client module 560 includes an interface utilized to manage the management server 550 directly or remotely via the network 540.

As illustrated in FIG. 5, the wireless devices C 512*c* and E 512*e* are connected, directly or indirectly, to pneumatic thermostats 522 and 526, respectively. The pneumatic thermostats 522 and 526 are connected to heating, ventilation, and air conditioning (HVAC) units 524 and 529, respectively, via pneumatic pressure lines 523 and 528, respectively. The pneumatic thermostats 522 and 526 control the operation of the HVAC units 524 and 529 by controlling the pressure in the pneumatic pressure lines 523 and 528, respectively. The pneumatic thermostat 526 includes a pressure controller 527 that controls the pressure within the pneumatic pressure line 528. In other examples, the wireless devices C 512 or E 512*e* are integrated within the pneumatic thermostats 522 or 526, i.e., wireless pneumatic thermostats.

In some examples, the pneumatic thermostats 522 and 526 control the HVAC units 524 and 529 via active feedback of branch pressure using a compact piezo-resisitve pressure sensor for branch line pressure measurement to control (e.g., modulate) the pressure in the pneumatic pressure line 523 and 528. The pneumatic thermostat 522 and 526 can have active feedback of branch pressure, and this active feedback advantageously allows for configuration of minimally open pressure settings, proportional band settings, and/or set point pressure. The active feedback further advantageously enables the control of variations in the controlled equipment and enables configuration at installation time using a supplied application programming interface (API). The pneumatic thermostat 522 and 526 enables the active measurement and control of the branch pressure at the thermostat; with the use of a piezoelectric valve or any other type of modulating value, more precise and efficient control of pneumatic HVAC system is made possible. In contrast, traditional pneumatic thermostats control the pressure based only on temperature information using simple bi-metals.

Traditional pneumatic thermostats are mechanical devices that rely on force balance between bi-metal flapper and air pressure in a mechanical nozzle to regulate branch line pressure. Changes in minimally open pressure settings, proportional band settings, temperature calibration or set point pressure can only be made by manually adjusting set screws on the traditional pneumatic thermostats; in many cases, these changes cannot be made on the traditional pneumatic thermostats and different mechanical designs are required to support the various setting requirements. Whereas any changes in settings in wireless pneumatic thermostats can be made by transmitting configuration commands dynamically and remotely through the wireless mesh network 510.

In some examples, the pneumatic thermostat 522 and 526 is designed as a retrofit to replace an existing pneumatic thermostat (e.g., a pneumatic thermostat with a simple bi-metal for temperature control) that controls pneumatically controlled heating systems, such as, in school and commercial type buildings. In some examples, the wireless pneumatic thermostat is powered by batteries and/or includes one or more power management techniques and is advantageously well suited for direct replacement of existing pneumatic thermostat without the need of installing power supply wires.

An introduction into the existing pneumatic field and the operation of component parts follows as an explanation of the functioning parts and interactions of those parts within the overall heating appliance. As an example, a Trane Unit Ventilator (i.e., a Trane HUV and VUV Classroom Unit Ventilator UV-PRC001-EN available from Trane Inc. of Piscataway, N.J.) is used as the HVAC unit 524 and 529 described herein. The interaction between an existing installation and the wireless pneumatic thermostat follow the introduction of the existing pneumatic field.

A pneumatic thermostat is used to change the pressure within a "branch" line proportionally to offset of temperature of the surrounding air from the set point temperature. The amount of change in temperature that is required to boost the output pressure of the pneumatic thermostat branch line from 3 to 13 psig (full closed to full open) is called the proportional band or the throttling range.

For example, a pneumatic controller with a range of 3 to 13 psig (i.e., 10 psig output or branch pressure range), a 71° F. set point, and a 4° F. throttling range are utilized in a HVAC system. If the thermostat is set at and senses 71° F., the output pressure of a properly calibrated controller will be the dead center value of 8 psig. As the temperature at the thermostat drops through one-half the throttling range, or 71° F. minus 2° F. to 69° F., the controller output pressure will drop through one half of its 10 psig pressure range to 3 psig. On a raise in temperature, when the temperature rises through one-half of the throttling range, or 2° F., to 73° F., the output pressure will rise through one-half of its pressure range to 13 psig. Therefore, as the temperature changes through 4° F. from the bottom to the top of the throttling range, the output pressure of the controller will change through a 10 psig range from minimum to maximum.

Figure 6:
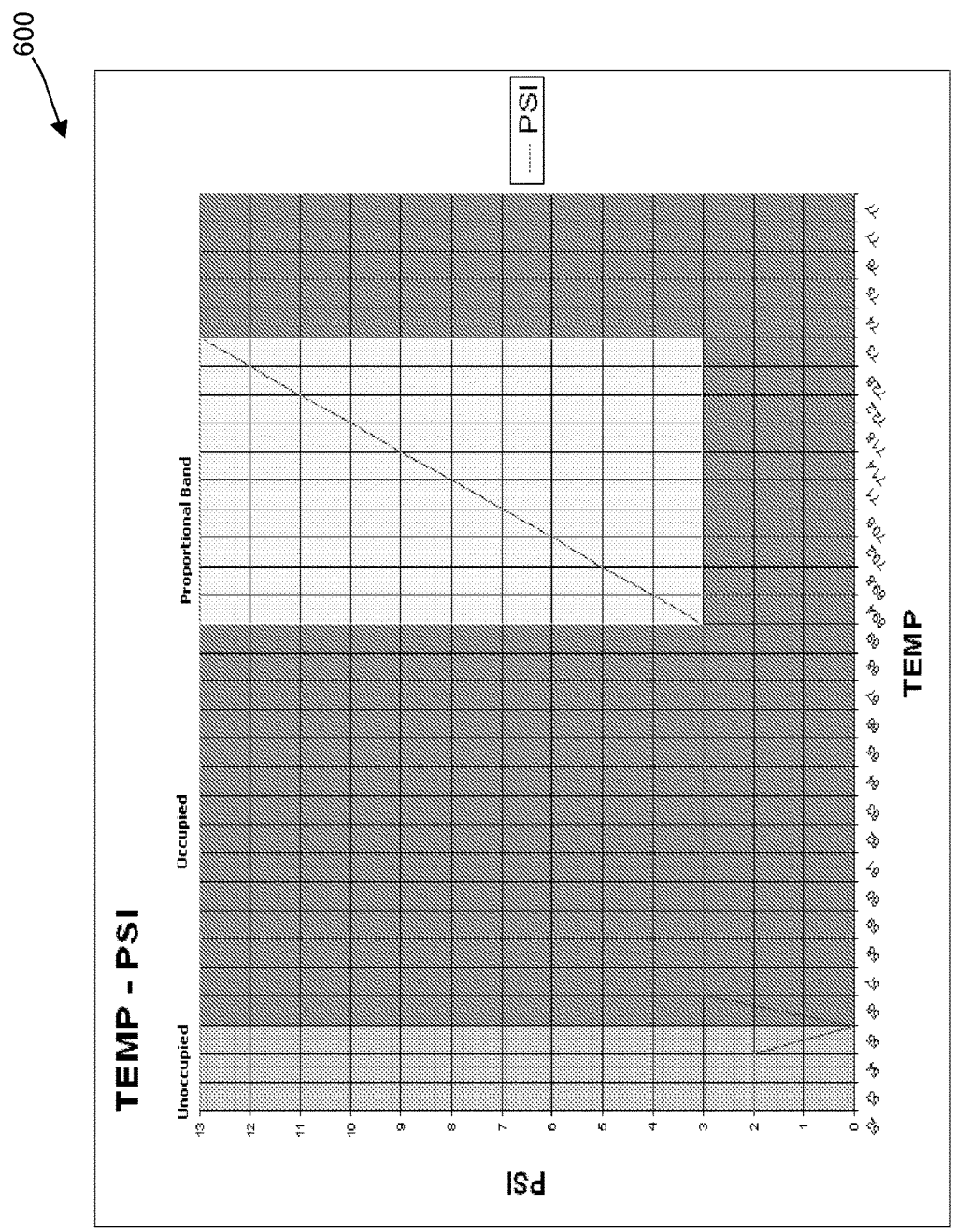
FIG. 6 illustrates a graph of the pressure range versus the temperature.

FIG. 6 illustrates an exemplary graph 600 of the pressure range versus the temperature. FIG. 6 illustrates a throttling range of 3 to 13 psig, a 71° F. set point at 8 psig, and 2° F. throttling range (i.e., from 69° F. to 73° F.) are utilized in a HVAC system. In other examples, before 69° F. is reached, the branch pressure can remain at 3 psig, which is the minimally open pressure for the fresh air damper.

FIG. 7A illustrates an exemplary hesitation actuator valve 700*a* and functional use of the valve 710*a*. An actuator can operate like a bellows or a piston. As the air pressure increases, the piston moves. When air pressure is removed, the piston returns to its minimum position under spring pressure. Springs are a critical component of pneumatic controlled devices. The springs are "tuned" to the actuation specifications. Springs are color coded according to their spring pressure and size, for example, 4 to 8 psi.

For example, using a direct-acting water valve actuator with a spring range of 9 to 13 psig acting on a valve the following actions could be expected. Assuming that the thermostat has a throttling range of 4° F. (i.e., proportional band) and with the thermostat set to 71° F., the pneumatic thermostat should increase the branch line pressure from 3 psig at 69° F. to 13 psig at 73° F. The set point of 71° F. should correspond to 8 psig which in pneumatics is "center," and is below the spring range of the valve (9 to 13 psig). At a temperature of 69° F. and below: thermostat sends a signal of 3 psig but the spring's lowest capability is 9 psig. The spring's pressure outweighs the air pressure so the actuator does not move and the valve remains in its normally closed/open position. As the temperature rises, the branch line air pressure from the thermostat also rises. When the air pressure rises above 9 psig the air pressure outweighs the spring's minimum pressure. The actuator moves to the balance point and the normally closed/open valve opens/closes somewhat. As the air pressure continues to raise, the direct-acting actuator moves to proportionately higher balance points. The normally closed/open valve opens/closes by the same proportion. Thus, pressures at or above 13 psig outweigh the spring's maximum pressure. The actuator is inflated to its fully extended position and the normally closed/open valve remains fully open/close.

Figure 7C:
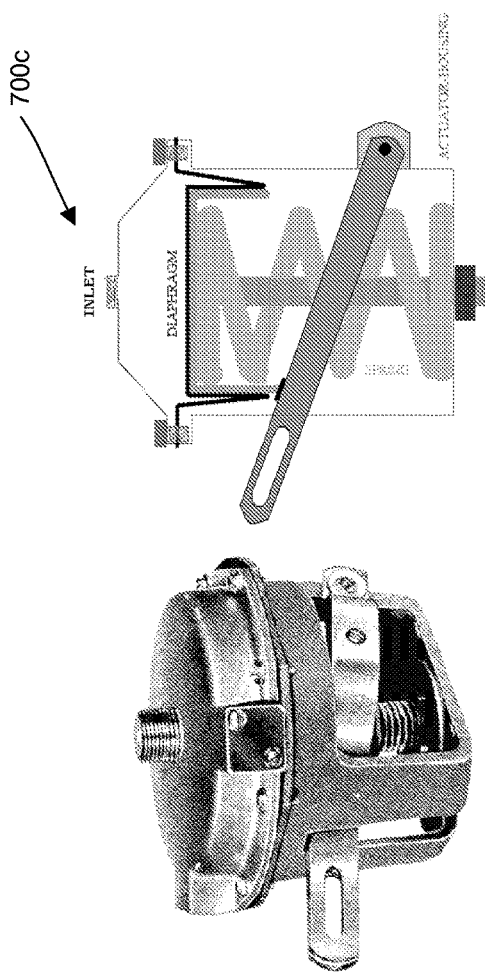
FIG. 7C illustrates an exemplary actuator.

FIG. 7B illustrates an exemplary hesitation actuator 700b, and FIG. 7C illustrates an exemplary actuator 700c. As suggested by the name, the hesitation actuator has two actuation cycles separated by a period of hesitation.

In some examples, the first portion of actuation of the hesitation actuator is to allow an external air damper to open to a predetermined (5-50%) position. This is known as the "minimally" open position, and this position can allow external "fresh" air to enter the heating apparatus and allow for a clean air exchange to occur thus minimizing $CO_2$ build up and increase internal comfort.

The minimally open position can be achieved by applying 3 psig to the diaphragm of the actuator; at this point the hesitation point is reached. The minimally open position along with the hesitation of the actuator allow for some portion of fresh air (5-50%) to be mixed during the whole heating cycle.

With no branch pressure to the diaphragm, the main spring forces the actuator shaft toward the upper housing, but is limited by the jam nut on the actuator shaft. As the branch pressure on the diaphragm increases from 0 to 2 psig (0 to 14 kPa), the compressive force in the main spring prevents the actuator shaft from moving. As the branch pressure increases from 2 to 3 psig (14 to 21 kPa), the force in the main spring is overcome and the actuator shaft moves to its hesitation point. At the hesitation point, the main spring seat is in contact with the retard spring seat.

During this time the return air damper remains fully open allowing the mixed outside air and return air to be passed across the hydronic heating coil who's supply valve remains open allowing maximum heat to be delivered to the coil. The compressive force in the retard spring prevents further actuator shaft travel between 3 and 8 psig (21 and 55 kPa) (e.g., 9 psig for 3-15 psig systems (21 and 63 kPa)).

Figure 7D:
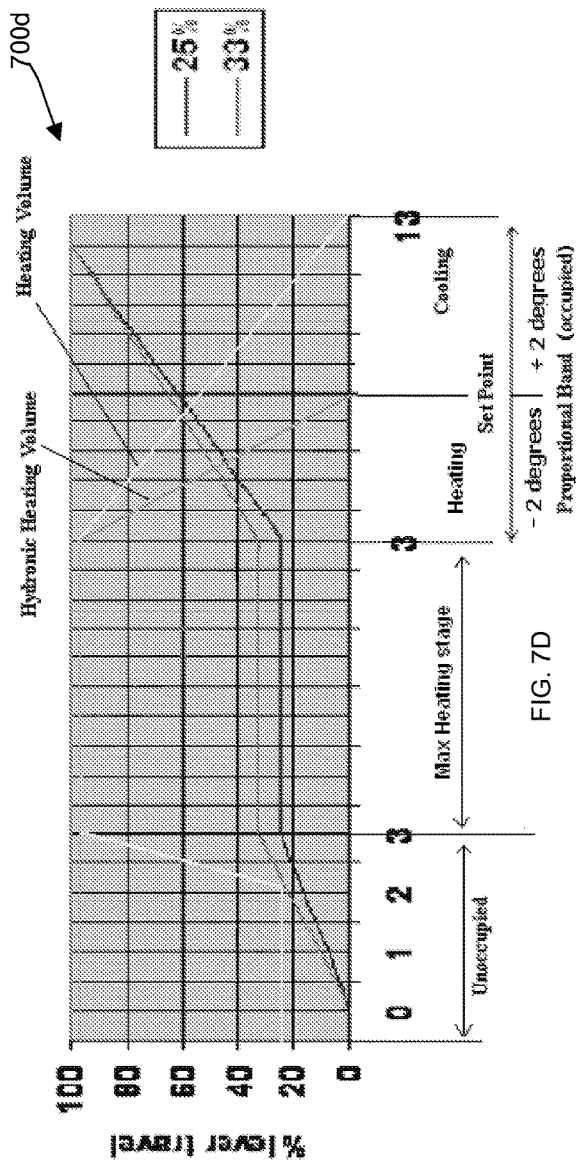
FIG. 7D illustrates an exemplary chart that indicates 2 positional patterns.

FIG. 7D illustrates an exemplary chart 700d that indicates 2 positional patterns for percentage openings, 25% and 33% for a 13 psig system. In this example, above 8 psig (55 kPa) (e.g., 9 psig (63 kPa) for 15 psig systems), the resisting force in the retard spring is overcome and the actuator shaft moves to its maximum stroke between 8 and 13 psig (55 and 90 kPa) (e.g., 9 and 15 psig (55 and 105 kPa) for 15 psig systems). This secondary travel portion of the "hesitation" actuator the outside air damper is opened further and the return air damper is closed further. This action takes place as the room temperature approached the set point, within the proportional band. In conjunction with the damper positional changes the hydronic supply is being modulated reducing the amount of heat being made available to the heating coil.

In this example, once the room temperature is above the set point but still within the proportional band, the outside air damper opens and the return air damper closes while the hydronic heat supply is further modulated, until the return air is sealed and the outside air is fully open and the hydronic heat supply is removed. This occurs in conjunction with the upper limit of the proportional band being reached and is a sign that the maximum cooling point has also been reached.

In some systems an additional exhaust fan may be attached to each unit or group of units (zone). Typically, if the zone approach is adopted, one master heating unit can control the exhaust for the whole zone.

Figure 7E:
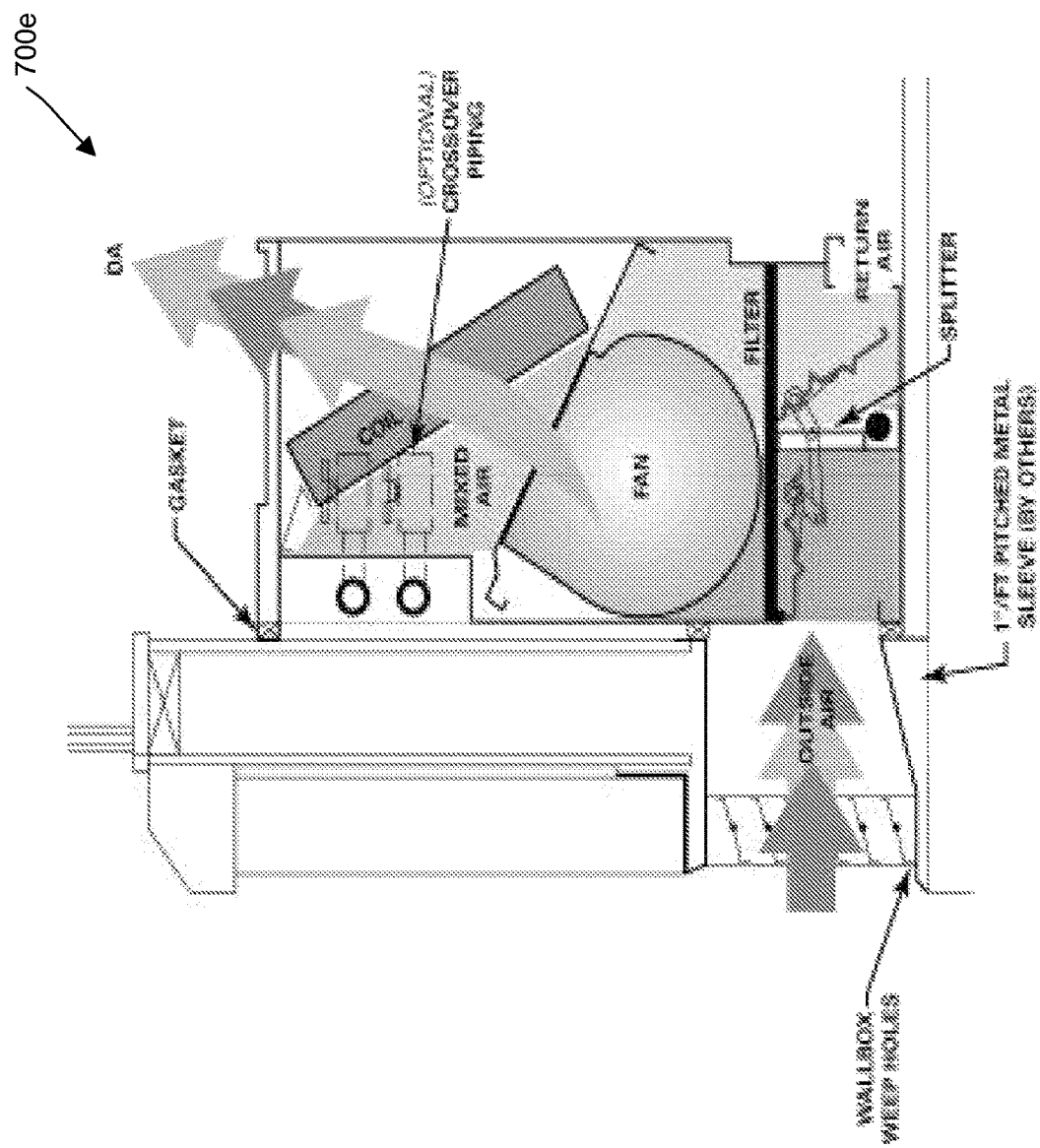
FIG. 7E illustrates an exemplary HVAC unit that can be controlled by a pneumatic controller.
Figure 8A:
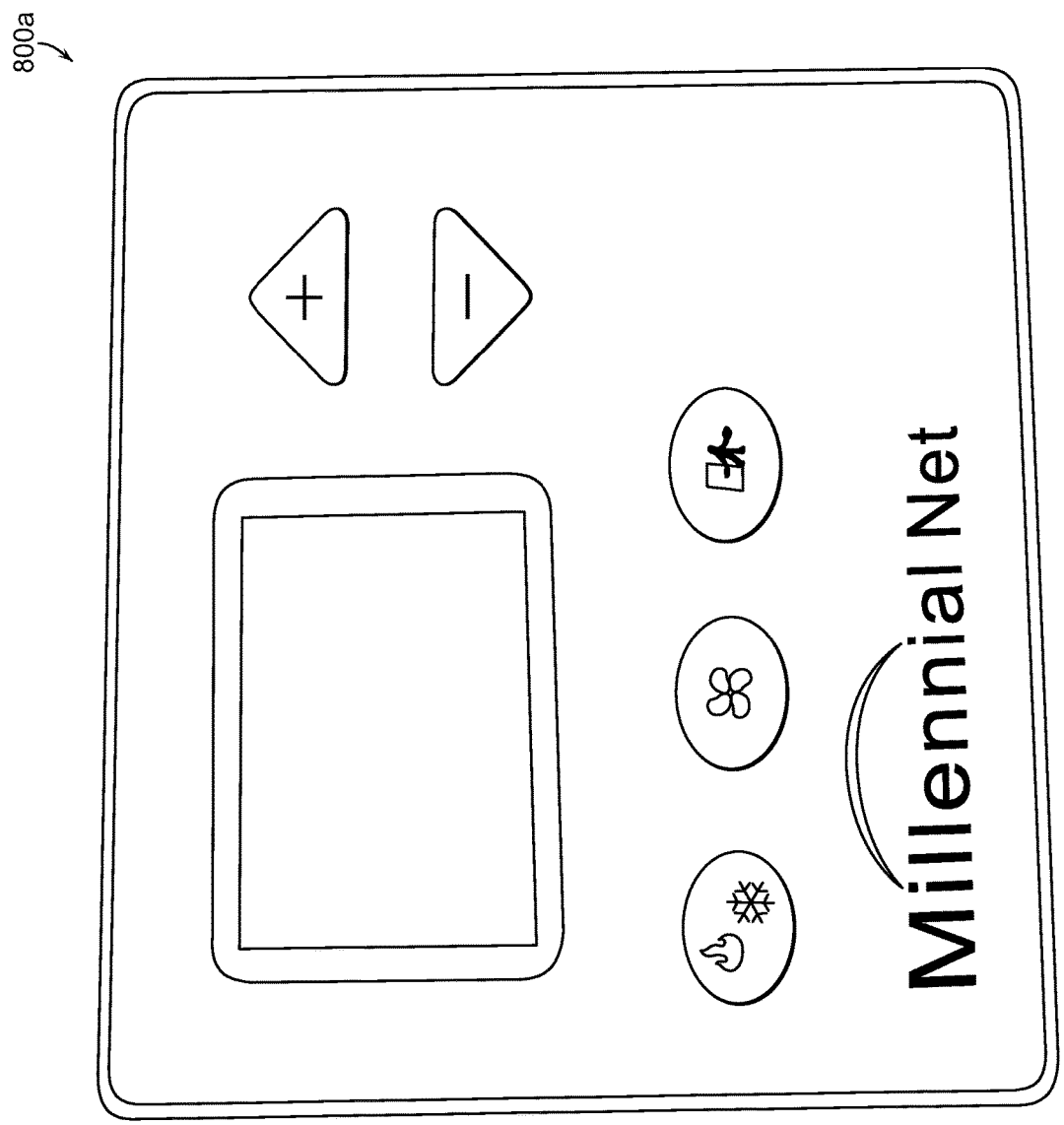
FIGS. 8A-8F illustrate exemplary wireless pneumatic controllers.
Figure 8B:
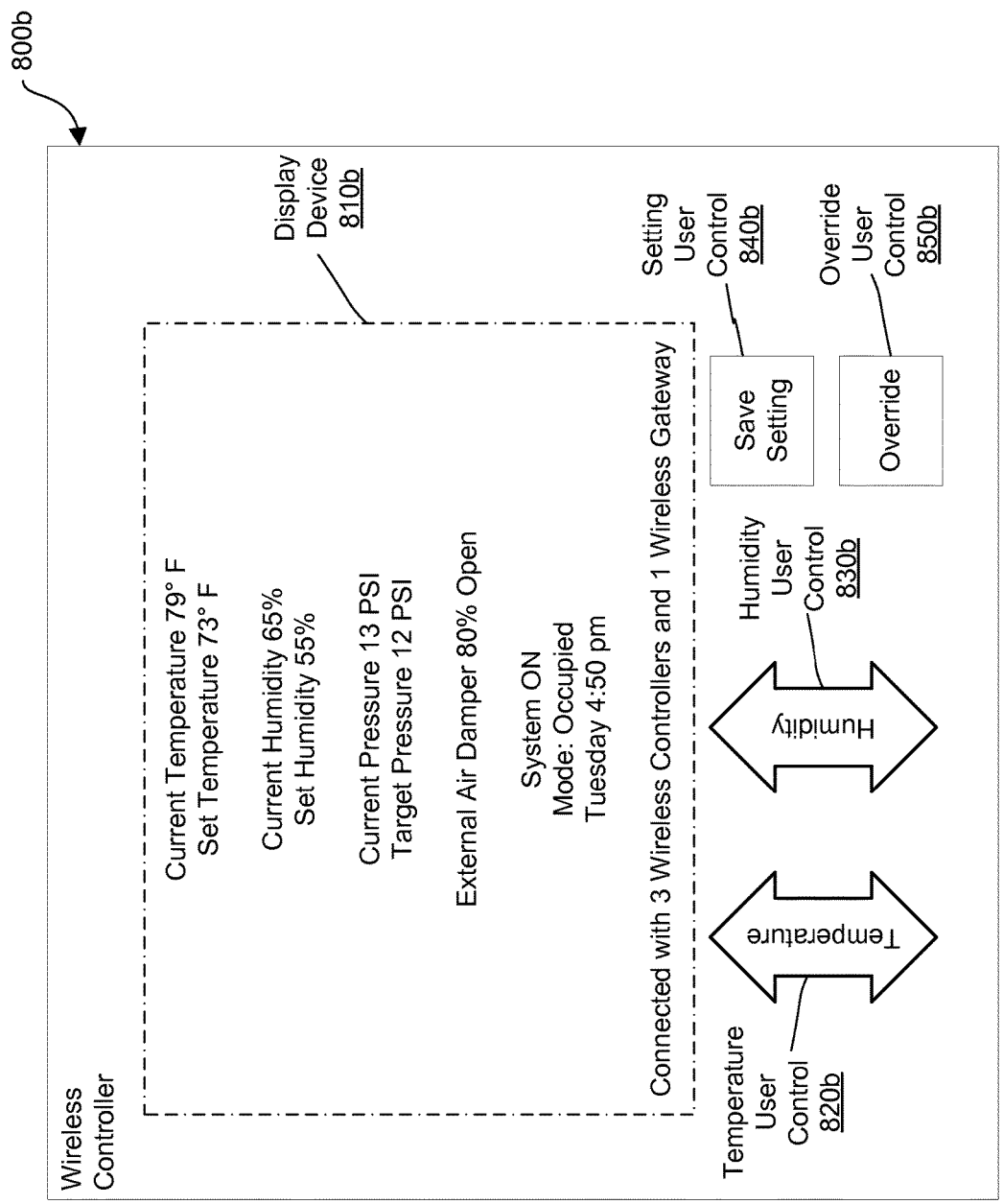
Figure 8C:
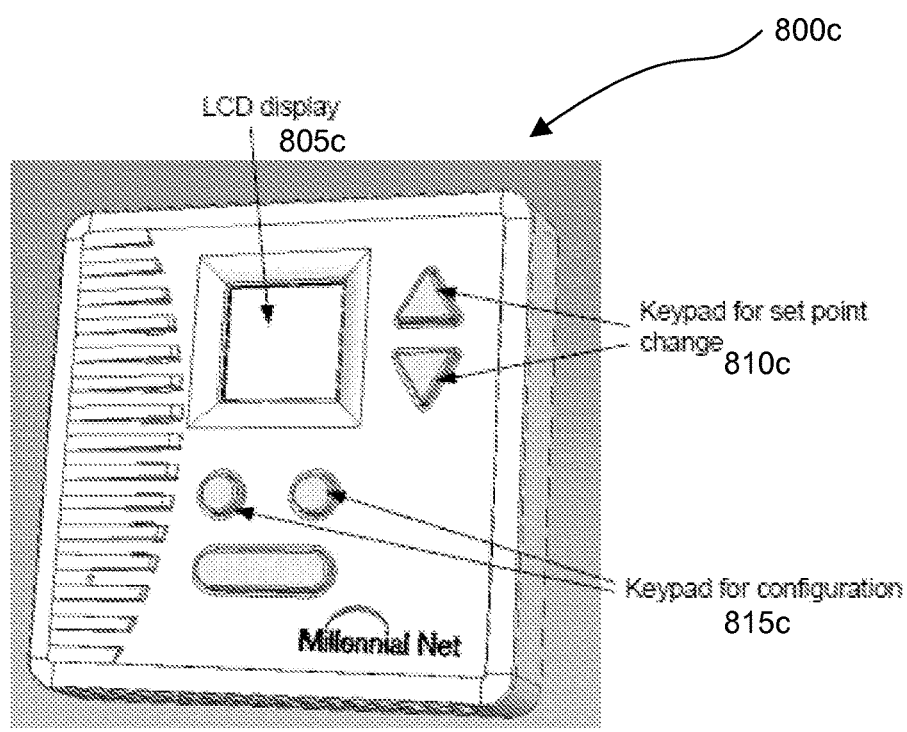
Figure 8D:
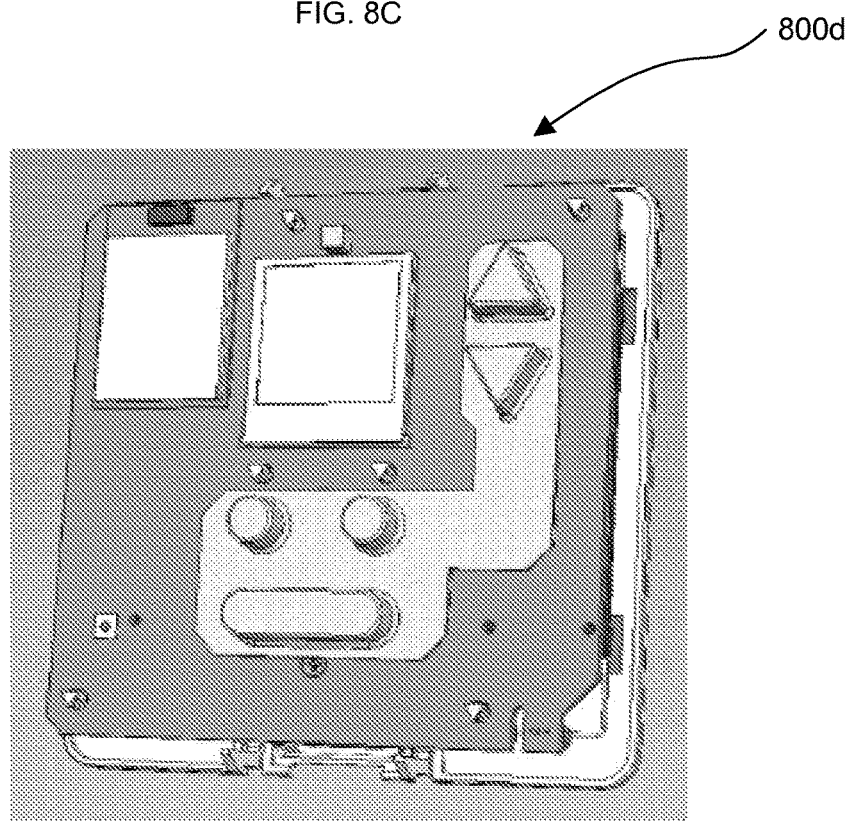
Figure 8E:
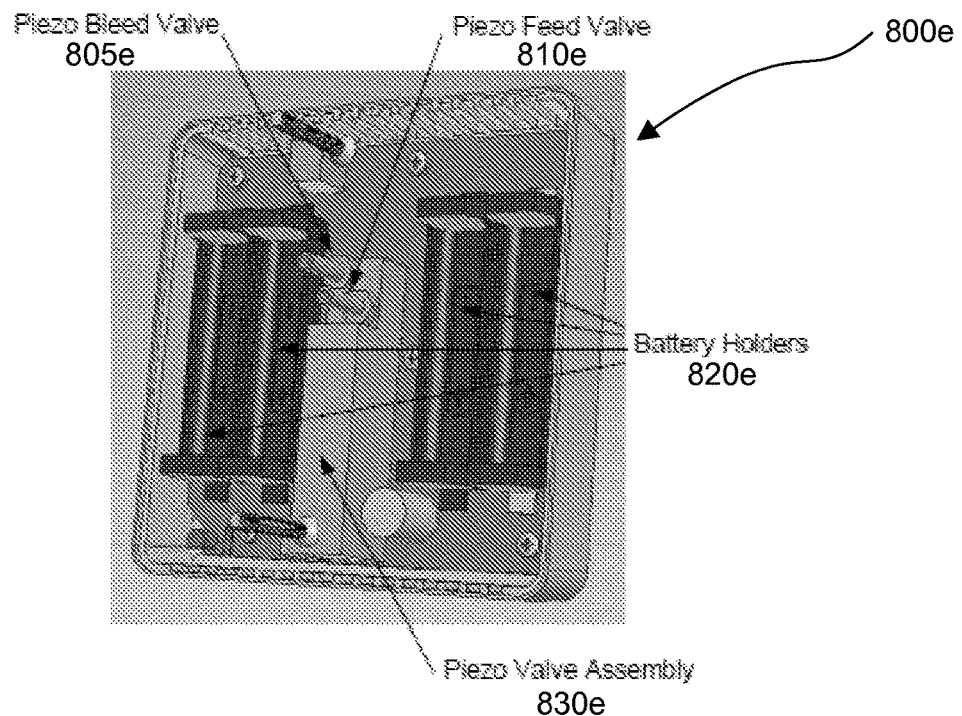
Figure 8F:
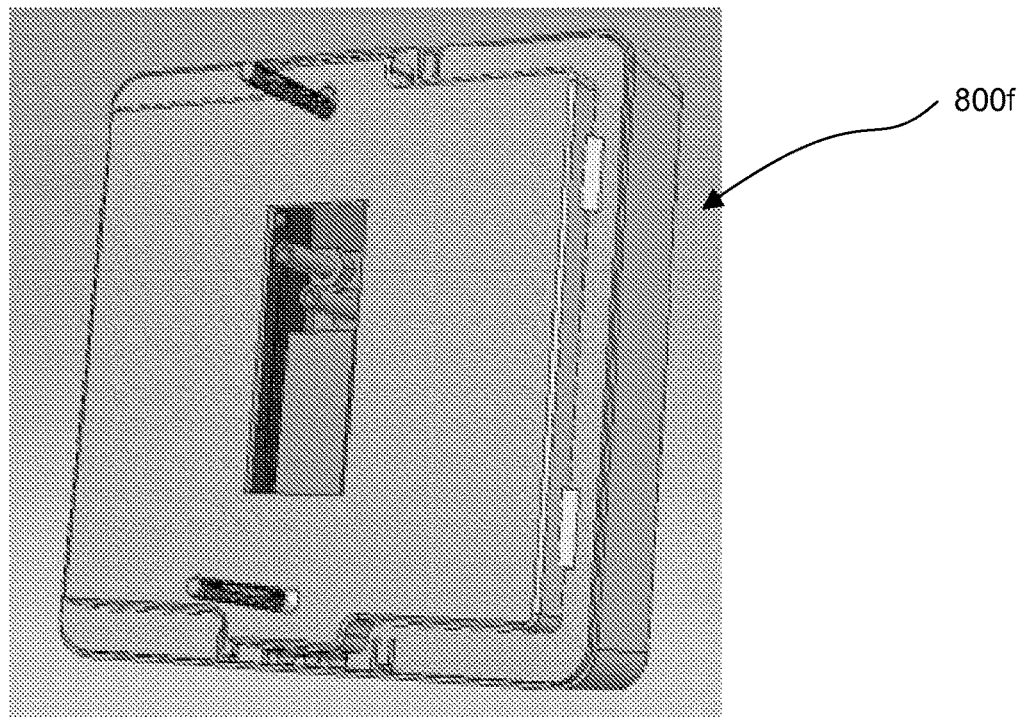

FIG. 7E illustrates an exemplary HVAC unit 700e that can be controlled by a pneumatic controller.

FIGS. 8A-8F illustrate exemplary wireless pneumatic controllers 800a, 800b, 800c, 800d, 800e, and 800f (generally referred to as 800). The wireless pneumatic controller 800 can include an integrated wireless device for communication with the wireless mesh network. In other examples, the wireless pneumatic controller 800 can be connected, directly or indirectly, with a wireless device for communication with the wireless mesh network.

The wireless pneumatic controller 800b includes a display device 810b, a temperature user control 820b, a humidity user control 830b, a setting user control 840b, and an override user control 850b. The display device 810b displays information to the user. The temperature user control 820b enables the user to raise or lower the temperature. The humidity user control 830b enables the user to raise or lower the humidity. The setting user control 840b enables the user to save the current settings. The override user control 850b enables the user to override the policy settings (e.g., 65 degrees from 7:00 pm through 7:00 am, 68 degrees at 5:00 pm, etc.).

The wireless pneumatic thermostat 800c includes a LCD display 805c, a keypad for set point change 810c, and a keypad for configuration 815c. The LCD display 805c displays information associated with the wireless pneumatic thermostat 800c. The keypad for set point change 810c enables the user to modify the temperature, humidity, and/or other information. The keypad for configuration 815c enables the user to modify the configuration associated with the wireless pneumatic thermostat 800c.

The wireless pneumatic thermostat 800e includes a piezo bleed valve 805e, a piezo feed valve 810e, battery holders 820e, and a piezo valve assembly. The piezo bleed valve 805e and the piezo feed valve 810e are connected to pneumatic pressure lines. The piezo valve assembly 830e controls the flow of pressure in the pneumatic pressure lines via the piezo bleed valve 805e and the piezo feed valve 810e.

The wireless pneumatic thermostat 800 replaces pneumatic thermostats used with HVAC system (e.g., heating systems, heating system with ventilators, etc.). In some examples, the wireless pneumatic thermostat 800 can replace pneumatic thermostats by swapping the thermostats and setting the pressure ranges for the HVAC system (e.g., 3 to 13 psig) on the wireless pneumatic thermostat. The wireless pneumatic thermostat 800 can enable the individual control of HVAC units (e.g., room heaters, room air conditioners, etc.) while allowing an energy profile (e.g., an energy policy, etc.) to be applied to a building or even individual units (e.g., unoccupied time periods, occupied time periods, etc.). The profile can be managed and/or applied by a management server and/or a wireless gateway via the wireless mesh network. In other words, the one or more wireless pneumatic thermostats and/or other wireless devices communicate with each other to form a wireless mesh network as further described herein.

The wireless pneumatic thermostat 800 can apply a policy to control one or more HVAC units and thereby maximize the energy efficiency of a building and/or a group of buildings. The policy can include an unoccupied period. In some examples of unit ventilators, during the unoccupied period each HVAC unit will be provided with a certain branch line pressure via the wireless pneumatic thermostat. In this condition, the fresh air damper is fully closed and the internal return air damper is fully open. This positioning allows for trickle heating to occur due to convection. In the event that the local temperature falls below the setback temperature, the wireless pneumatic thermostat starts the fan on each HVAC unit to assist in the heating of the local area until the setback point is achieved.

In some examples, the internal relay threshold to switch the fan on is set to less that 3 psig. In this example, the wireless pneumatic thermostat can apply less than 3 psig, which enables the relay to energize the fan without affecting the position of the dampers.

In other examples, the fan is controlled by using a secondary relay in parallel with the relay. The secondary relay can be driven with an optically isolated relay on the wireless pneumatic thermostat. In this example, the location of the wireless pneumatic thermostat 800 can be close in proximity to the HVAC unit being controlled to allow for the optically isolated relay.

The policy can include an occupied period. During the occupied period, each HVAC unit is controlled in a manner consistent with a standard pneumatic thermostat. For example, on entering an occupied period, a pressure at 3 psig is applied to the circuit causing the external damper to open to its minimally open position and the fan to start. In this example, the hot water valve would be in its fully open position and heating would continue unabated until the set point (i.e., ½ proportional band) temperature is reached. At this point, the wireless pneumatic thermostat 800 can start to increase the pressure being applied to the HVAC unit at a rate of (proportional band/10), thereby allowing the standard sequencing of pneumatic valves and damper as described herein.

In other examples, the wireless pneumatic thermostat 800 has active feedback of branch pressure; this allows for configuration of minimally open pressure settings, proportional band settings and/or a set point pressure. Further, the wireless pneumatic thermostat 800 can include, for example, direct measurement of branch line pressure and/or room temperature, thereby advantageously increasing the efficiency of HVAC system by utilizing direct digital control of the temperature and/or humidity without the need of installing wires. In addition, the direct pressure feedback measurement advantageously enables remote diagnostics and maintenance of pneumatic systems for pressure leakage and/or actuator failure.

In the case where there is a severe leak in the pneumatic line, the wireless pneumatic thermostat 800 can effectively detect the leakage and enter into a binary mode where the piezo feed valve will be fully open and bleed valve closed to increase branch line pressure for cooling or heating, and piezo bleed value will be fully open and feed valve closed to decrease branch line pressure for heating or cooling. By operating in binary mode, the wireless pneumatic thermostat 800 can effectively regulate space temperature using binary control action without controlling the valves in the standard modulating manner in a leaky condition which could consume excess battery power.

In the event that control of a remotely located fan and/or heating and/or cooling unit is desired, the wireless pneumatic thermostat 800 can be configured to send fan/heat/cool requests wirelessly to a wireless controller input/output (IO) device. Upon receipt of the fan/heat/cool requests, the controller IO device can manipulate the remote fan/heat/cool unit accordingly. This peer-to-peer communication mechanism advantageously expands the pneumatic control system functionality to facilitate coordination between a pneumatic control system and a remotely located fan, heating or cooling unit. One example of this feature is a building with a central heating system based on pneumatic control and the building uses window type air conditioners for cooling. The wireless pneumatic thermostat 800 can be used to control the heating system, and a wireless controller IO device can be used to control the window air conditioner, and a user can use the wireless pneumatic thermostat 800 to specify both heating and cooling set point temperatures and the wireless pneumatic thermostat can control the heating system and coordinate with the wireless controller IO device for window air conditioner control.

Low-Power Multi-Hop Communication with Variable Latency

The technology can utilize a wireless mesh network to control a system which requires variable communication latency such as a lighting system. There is generally some minimal latency involved due to the nature of multi-hop communication of the mesh network. Normally, this latency can be minimized when using fully-on, always-on intermediate routers. When the routers are always on (i.e., always listening with 100% duty cycle), the packets can be relayed relatively quickly, so that the latency from the user (e.g., light switch) to the controlled device (e.g., light dimmer) can be reasonably short. However, when the routers need to be battery powered, the radio in the router may use duty cycling so that the power consumption can be minimized. For example, the router may wake up only once every 200 ms, and in this example, the latency per each hop (relay) may be up to 200 ms. If the controlled device (e.g., light dimmer) is controlled via N hops, the latency may be up to N×200 ms.

In a simple application that requires simple on/off operation (such as light on/off), this potential latency may not be an issue. However, some control systems require stream of continuous control data to be transmitted with relatively low latency. For example, many dimming control systems control the intensity of the light by the time a push button is kept pressed. For example, the user presses a push button on the light switch and holds it pressed, then the dimmer continuously increase or decrease the intensity of the light until the button is released. In this application, the latency caused by relaying packets may be very disturbing to the user. With the relatively long latency, the dimmer will not stop increasing/decreasing the intensity of the light for some time (e.g., as much as the communication latency due to multi-hoping) even after the user released the push button switch. In this scenario, the user will have a hard time controlling the light intensity to his/her intended level.

The variable latency control technology described herein minimizes the latency in control applications using multi-hop network with battery powered routers. Normally, all the routers in the network run with low duty cycle (for example, 1%, wakes up for 2 ms only once every 200 ms) to conserve battery. However, when the control packet is passed through by the wireless routers (e.g., wireless devices operating as a wireless router) along the path from the originator (e.g., light switch) to the destination (e.g., dimmer), the routers in the path automatically turns to "high duty cycle" mode (e.g., 100% duty cycle) immediately. The routers in the path will tentatively remain at the high duty cycle (e.g., 100% duty cycle) until the control activity is finished. Since the intermediate routers are running at high duty cycle during the time of the control activity, the latency of the packet relay will be minimized (for example, a few milliseconds to tens of milliseconds of latency instead of seconds) and the user will get fast response during the time the user wirelessly controls the destination device (e.g., the dimmer). When the control activity is finished (e.g., When the dimming control is finished and the user has set the light to its proper intensity level, the user will release the button), the routers in the path will all go back to its normal operating mode with low duty cycle to conserve battery.

Figure 9A:
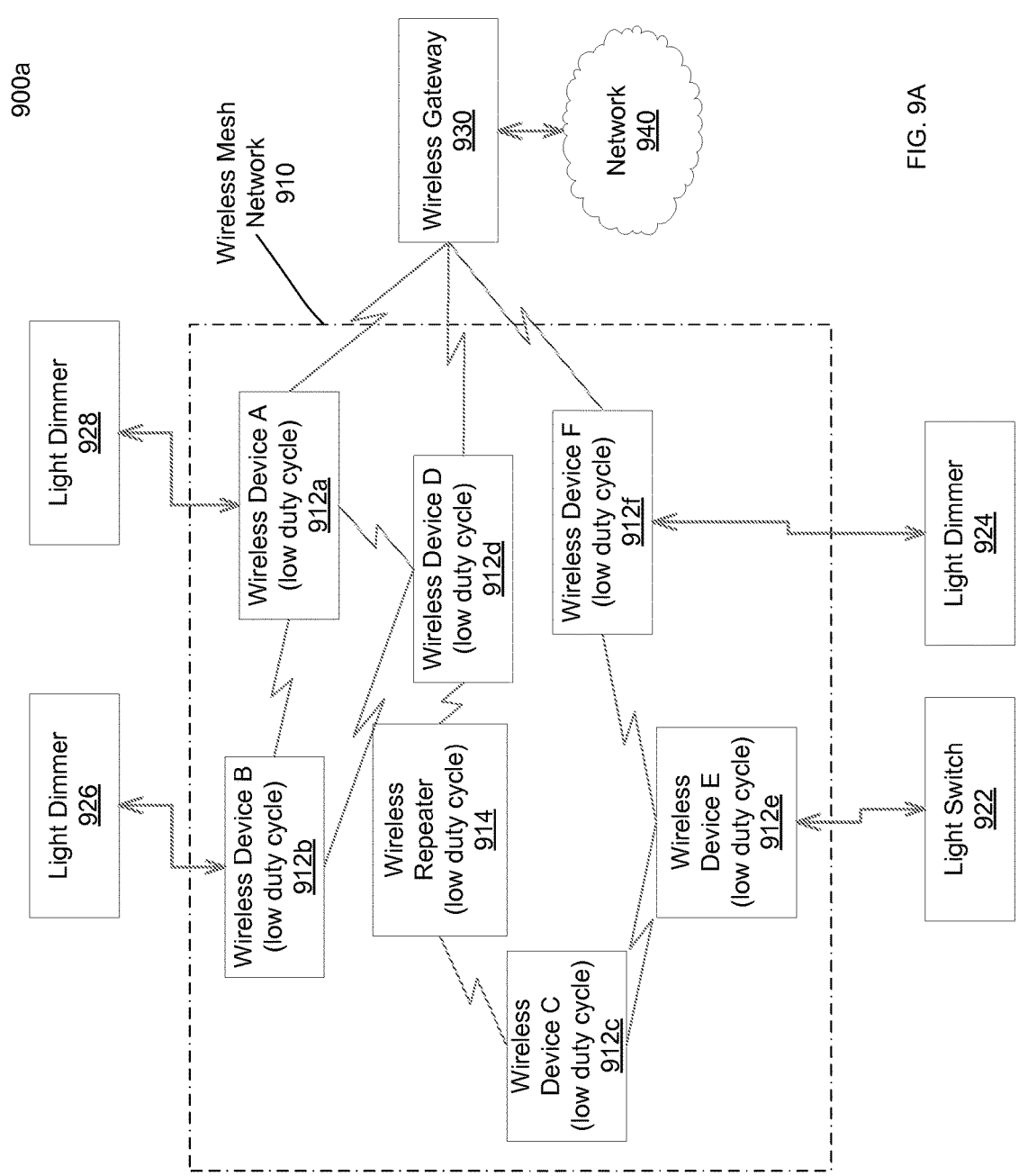
FIG. 9A illustrates an exemplary wireless mesh network with a light dimmer controller and a plurality of lights.
Figure 9B:
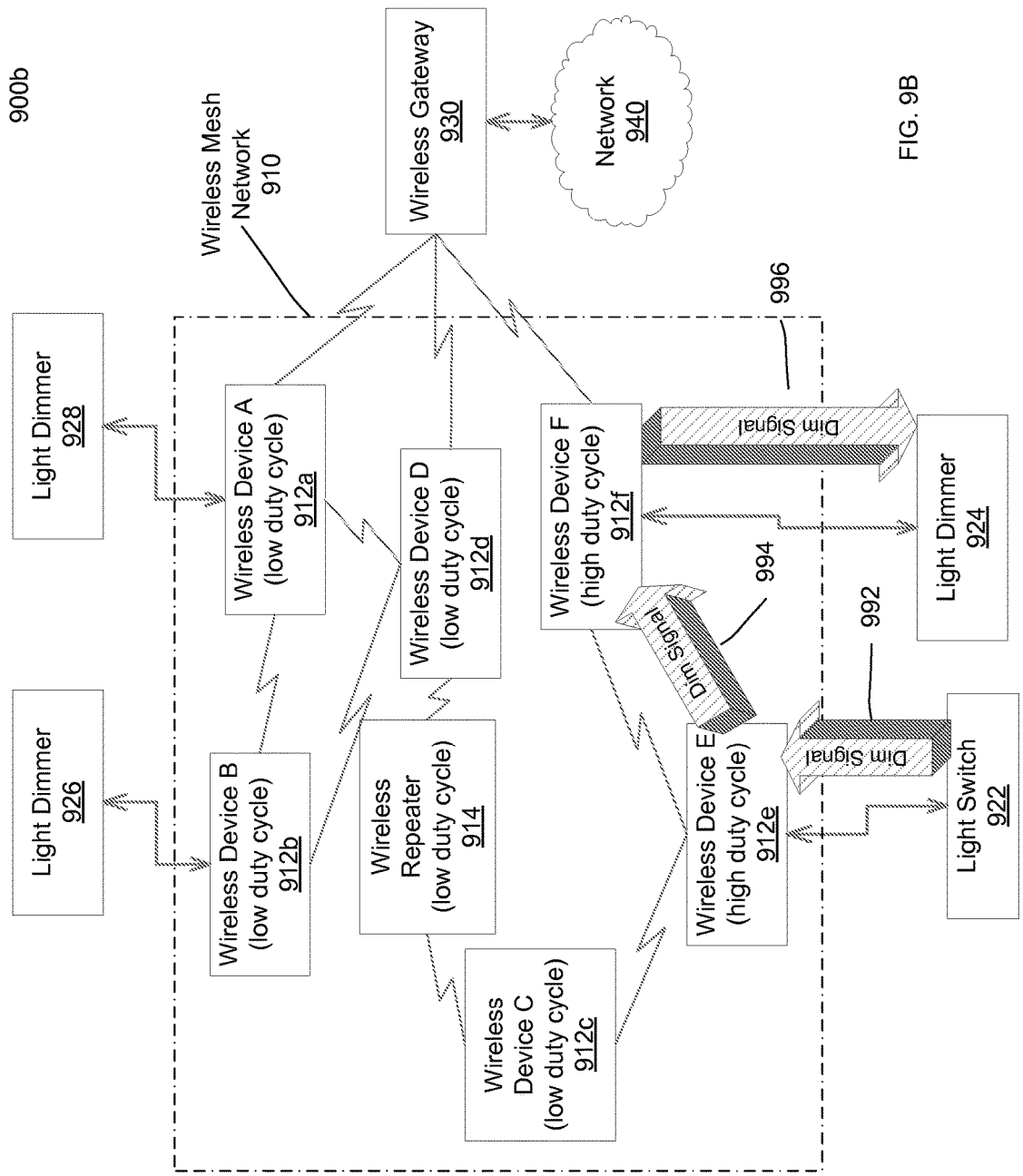
FIG. 9B illustrates an exemplary wireless mesh network with a dimming signal transmitted via two wireless devices.
Figure 9C:
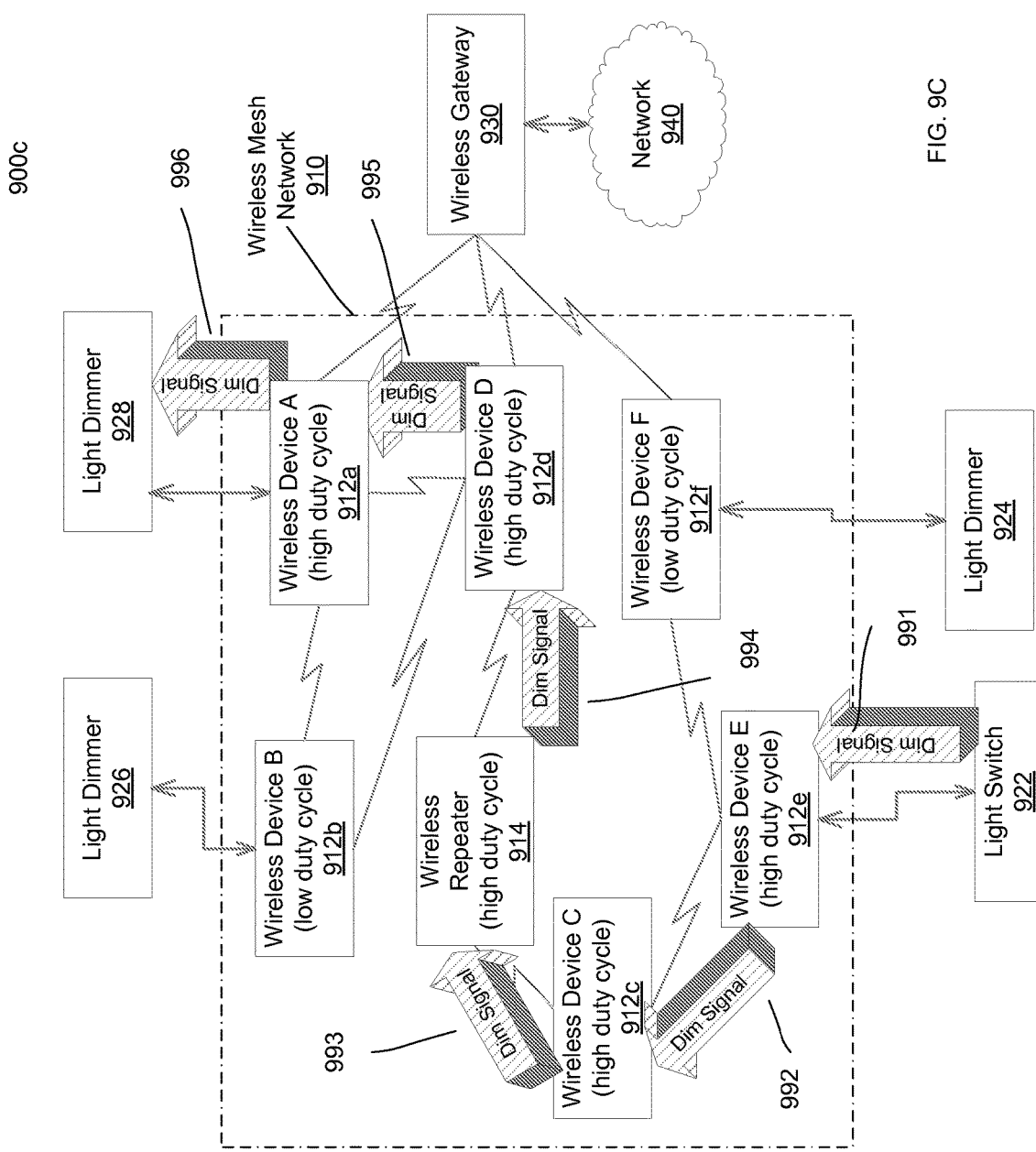
FIG. 9C illustrates an exemplary wireless mesh network with a dimming signal transmitted via four wireless devices and one wireless repeater.

FIGS. 9A-9C illustrate exemplary wireless mesh environments 900a, 900b, and 900c (generally referred to as 900). The wireless mesh environments 900 are described together. The wireless mesh environment 900 includes a wireless mesh network 910, wireless devices 912a, 912b, 912c, 912d, 912e, and 912f (generally referred to as 912) that operate in the wireless mesh network 910, a wireless repeater 914, a wireless gateway 930, and a network 940. The wireless repeater 914 forwards and/or routes communications between wireless device D 912d and wireless device C 912c via the wireless mesh network thereby extending the range of the wireless mesh network 910. The wireless gateway 930 connects the wireless mesh network 910 to other devices (not shown) via the network 940.

FIG. 9A illustrate the exemplary wireless mesh environment 900 with a light switch (e.g., "user") 922 and a plurality of light dimmers (e.g. "controlled devices") 924, 926, and 928. The light switch 922 and the plurality of light dimmers 924, 926, and 928 are interconnected via the wireless mesh network 910. As illustrated in FIG. 9A, the wireless devices 912 are in low duty cycle mode.

FIG. 9B illustrates the exemplary wireless mesh network 819 with a dimming signal 992, 994, and 996 transmitted via two wireless devices E 912e and F 912f. As illustrated in FIG. 9B, the wireless devices E 912e and F 912f transition into a high duty cycle mode (e.g., always on, 100% power for 5 ms, etc.). After the dimming cycle is complete (e.g., no further signal for a predetermined time period, no further signal for a dynamically generated time period, etc.), the wireless devices E 912e and F 912f can transition into a low duty cycle mode (e.g., wake for 4 ms every 400 ms, wake based on a generated wake-up schedule, etc.).

FIG. 9C illustrates the exemplary wireless mesh network 910 with a dimming signal 991, 992, 993, 994, 995, and 996 transmitted via four wireless devices E 912e, C 912c, D 912d, and A 912a and one wireless repeater 914. As illustrated in FIG. 9C, the wireless devices A 912a, C 912c, D 912d, and E 912e and the wireless repeater 914 transition into a high duty cycle mode. After the dimming cycle is complete, the wireless devices A 912a, C 912c, D 912d, and E 912e and the wireless repeater 914 can transition into a low duty cycle mode.

Although this technology describes use in a light dimming control application as an example, the technology can be utilized in any field that needs to reduce the relay latency during certain operations while minimizing power usage when the routers are not relaying packets (e.g., fan control, volume control, mute control, etc.).

Network Health Monitoring

The technology can monitor the health of a wireless mesh network (e.g., wireless mesh network 110 of FIG. 1, wireless mesh network 910 of FIG. 9A, etc.). In a wireless mesh network, an evaluation of the network health and current status is important. This evaluation can include, for example, a daily uptime rate. To quantify historic performance in terms of day, the device uptime rate can be quantified as the number of data packets received from a device divided by number of data packets ideally expected from the device based on a sampling interval (e.g., 450/1000=45%).

In some examples, a comparison of the uptime rate device by device and/or day by day provides information regarding network health and can help to resolve any network health issues.

In some examples, the steps to calculate the uptime rate can include one or more of the following:

1. Choose the specific register data for each device (e.g., signal strength, mode, set temperature, etc.). In other examples, the specific register data related to the primary purpose of each device can be utilized. For example, a temperature reading for wireless temperature devices. As another example, a heat beat for a wireless router;

2. Count the data packets received from the device for a single day based on information in a monitor database; and 3. Divide the number of data packets received by the number of data packets that should be received (e.g., based on a network profile, based on previously network transmissions, etc.).

The uptime rate should be between 0-100%. For example, 100% represents that all the data from the device that was expected to be received from the device was received. As another example, 0% means that no data was received from the device on the day.

The evaluation of the wireless mesh network can also include an overall performance (i.e., site-wide performance). Although the uptime rate for a device can quantify the performance we observed for a single device, the uptime rate cannot differentiate whether the compromised performance (<100%) is caused by device faults, wireless mesh network instability, and/or or by connection faults. To differentiate these causes, the device level performance is compared to the site-wide performance.

To review the uptime rate more efficiently, a visualization application programming interface (API) gadget can be, for example, utilized for displaying the performance information. As an example, the programming of the API gadget is done by python and java script language.

Figures 3, 10A:
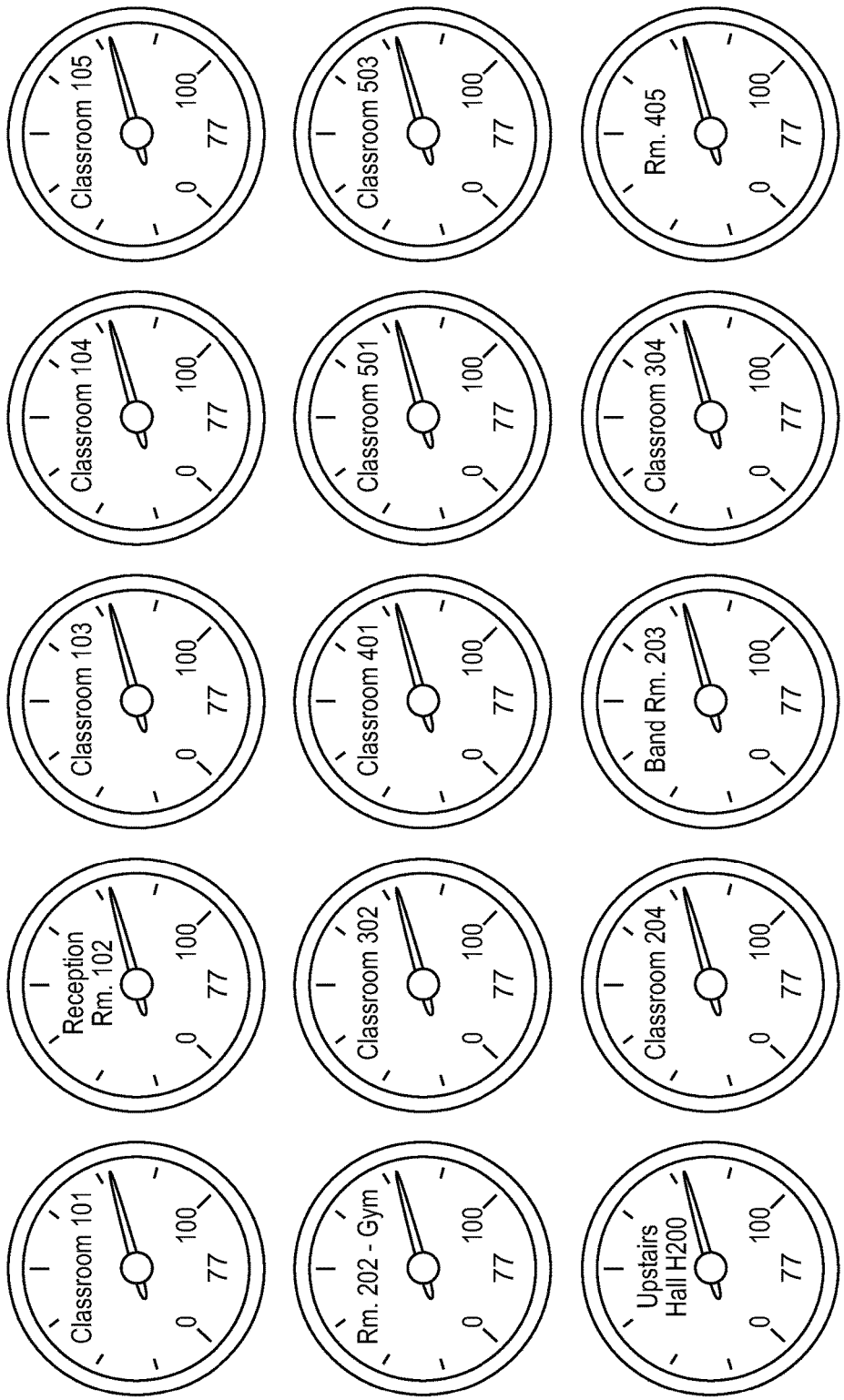
FIGS. 10A-10D illustrate screenshots of an API gadget.
Figures 4, 10A:
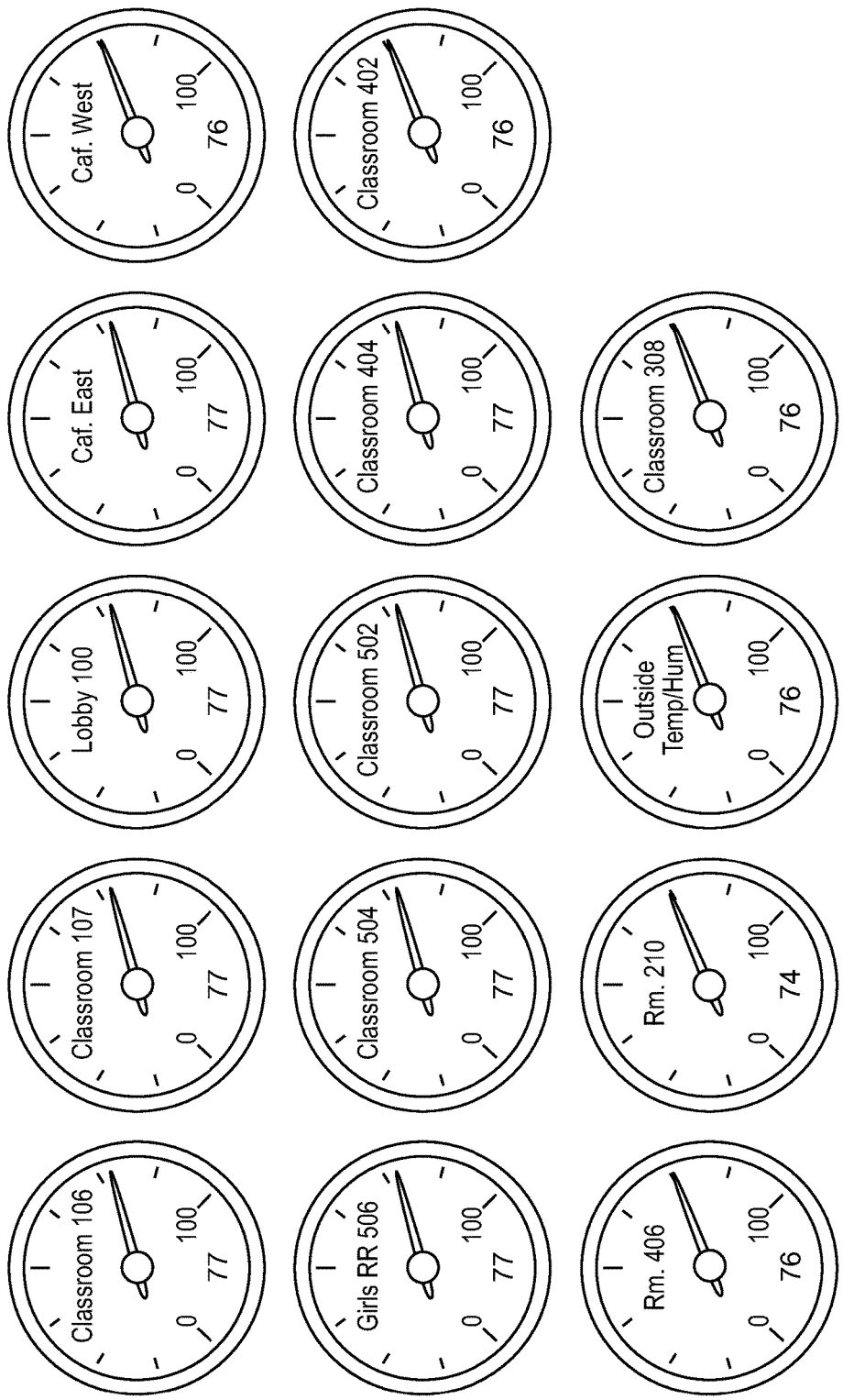

FIG. 10A illustrates a screenshot 1000a of the API gadget. The screenshot illustrates data of an exemplary site, Cherokee K-8, stored from Aug. 4, 2009 to Sep. 1, 2009. The trend graph shows that the device level performance day by day and device by device. Since most of the time, all the 29 devices' behavior in the Cherokee site are similar the compromised performance is caused by the management of the wireless mesh network and/or a site connection issue rather than either a mesh network issue and/or a device level issue.

In FIG. 10A, each gauge represents the average uptime rate of the each device during the selected period. Most of the devices (75%) show 77% uptime rate and 25% device show either 74% or 76% uptime rate during this period. This uptime rate distinguishes the device level performance from the site-wide level performance, thereby advantageously reducing the time to evaluate the network health and/or to correct any issues related thereto.

Figures 1, 10B:
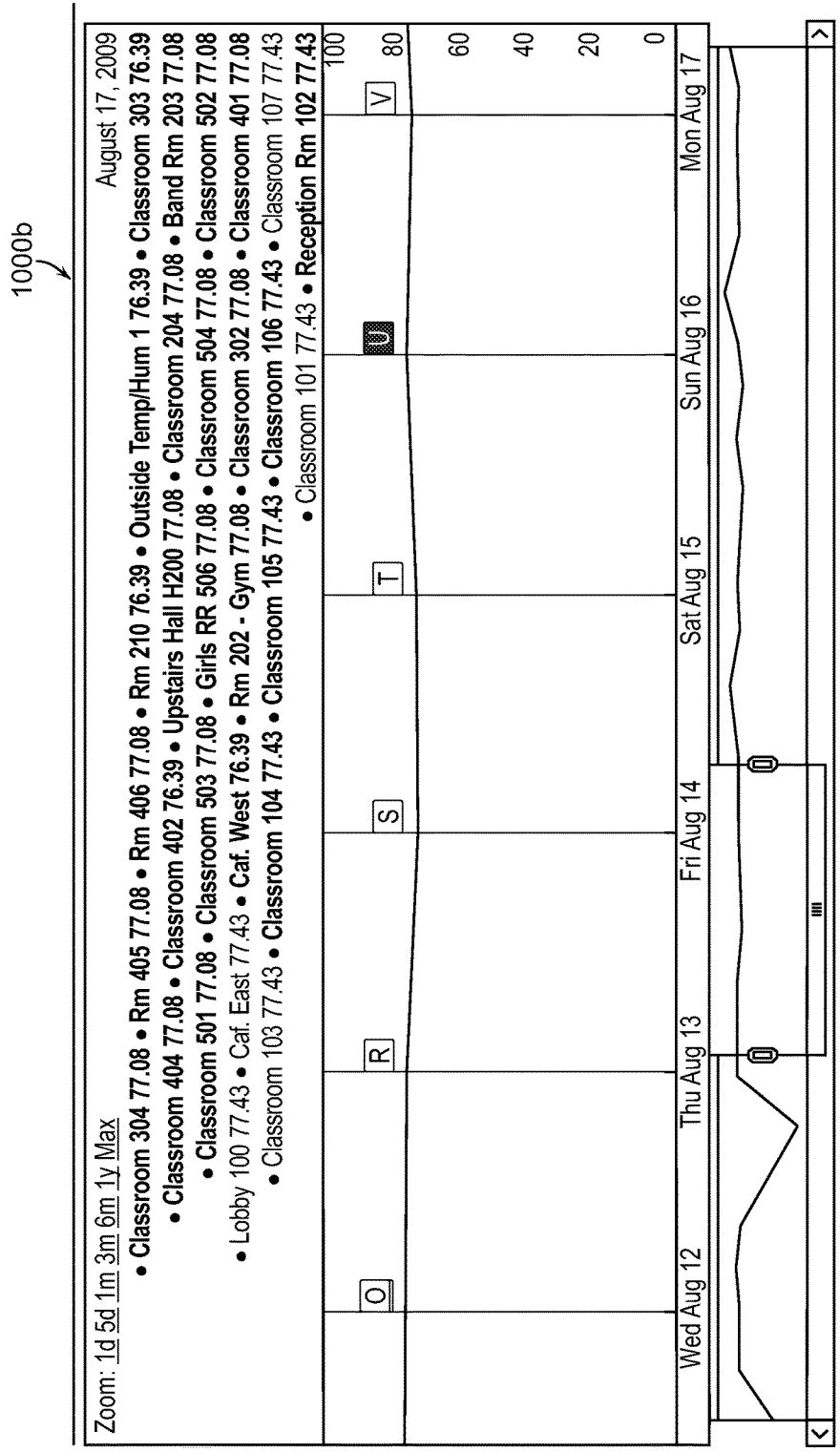
Figures 2, 10B:
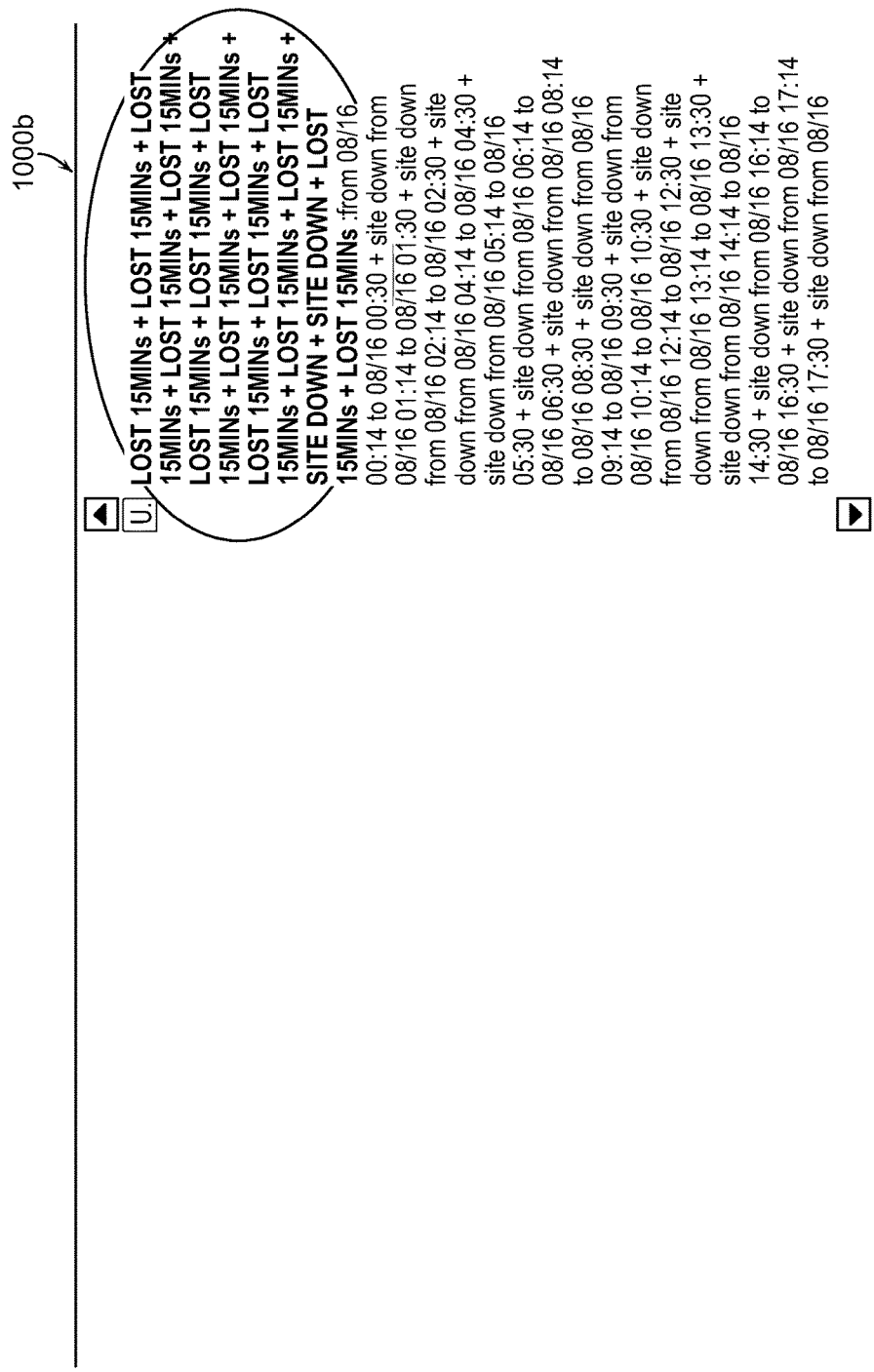

The network health monitoring technology further enables the analysis of site-wide performance issues to fix any performance issues. As illustrated in FIG. 10A, the performance issue is caused by site-wide phenomena rather than a device level issue. In some examples, the site-wide phenomena can be caused by two possibilities that cause a data lose from a wireless gateway to the storage database since there are two components associated with this process. The first component is a lost 15 mins package, which is a logging file transmitted from the wireless gateway to the database server. The second component is a failure between the wireless gateway and the database server. To differentiate these issues, the technology searches the device down results and decides whether it was a consistent 15 mins phenomena for site-wide or not. If it was site-wide phenomena, the technology flags the issue as "lost 15 mins" as shown in a screenshot 1000b of FIG. 10B.

Figures 1, 10C:
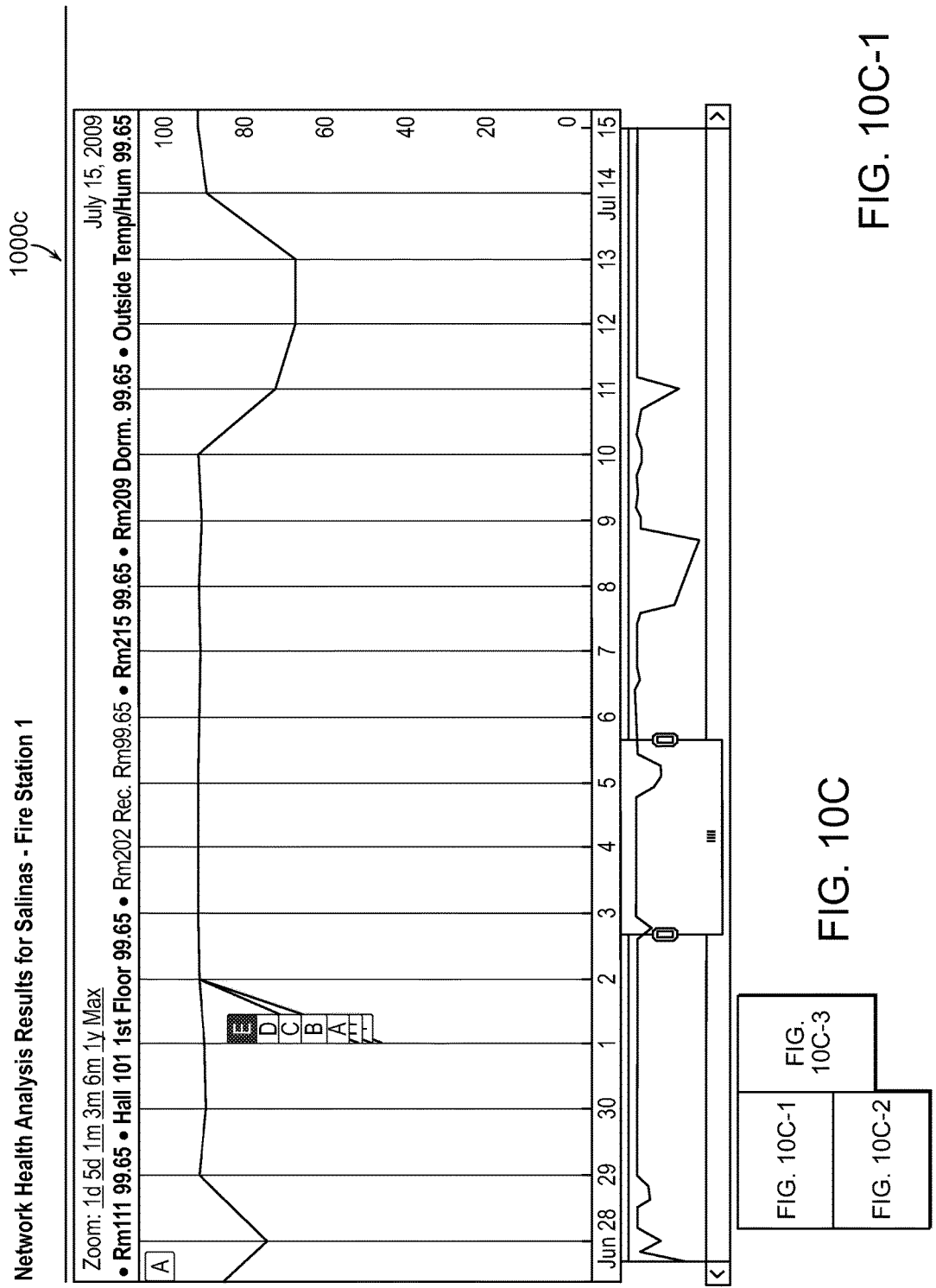
Figures 2, 10C:
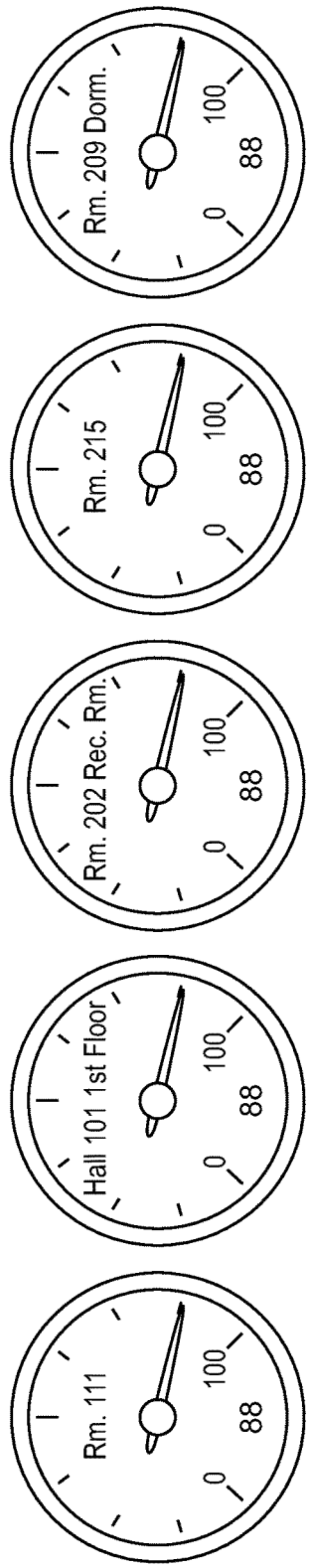
Figures 3, 10C:
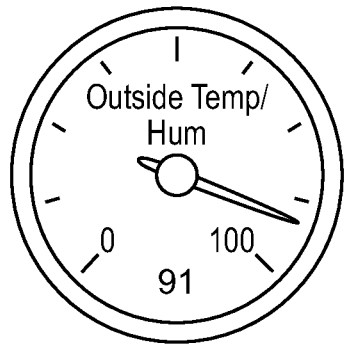

The technology further enables the noting of a special event since the device uptime rate is considered the special case such as when specific device is added on later or terminated earlier. The technology notes these events to accommodate the network health analysis as shown in a screenshot 1000c of FIG. 10C.

Figures 2, 10D:
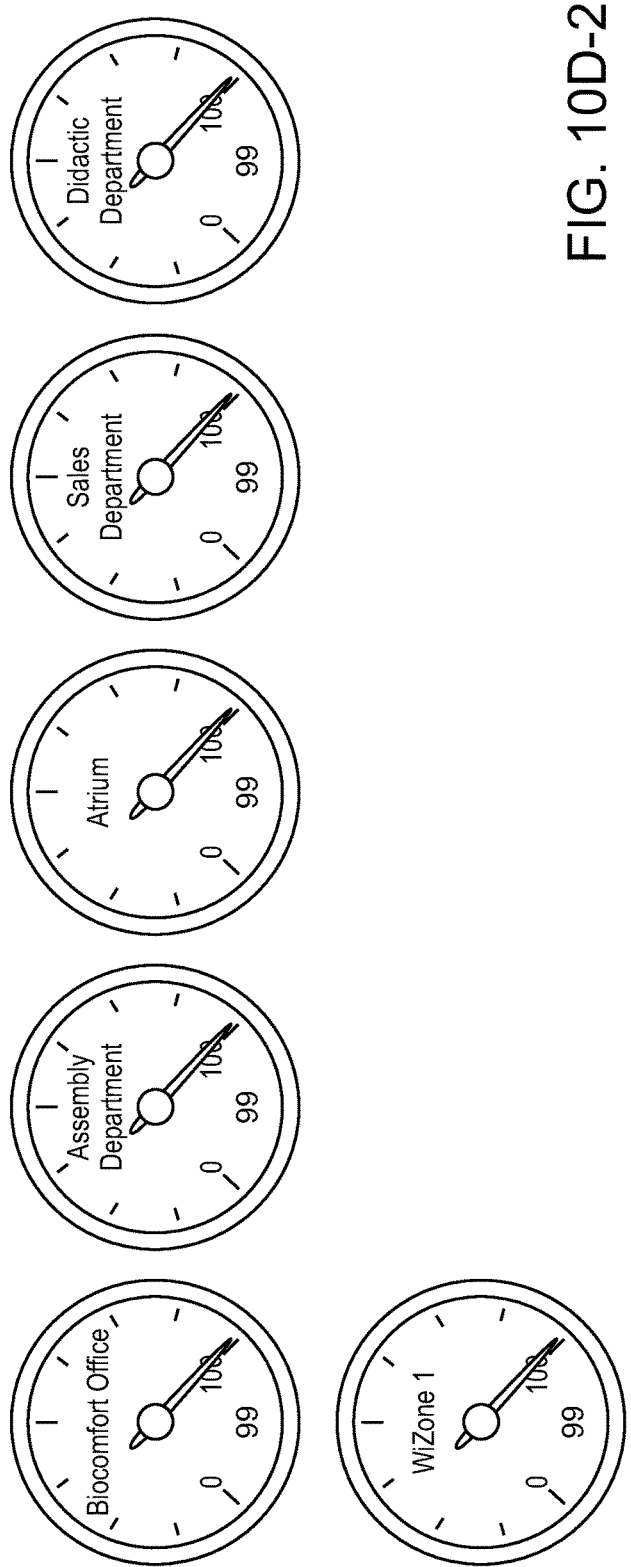
Figure 10D:
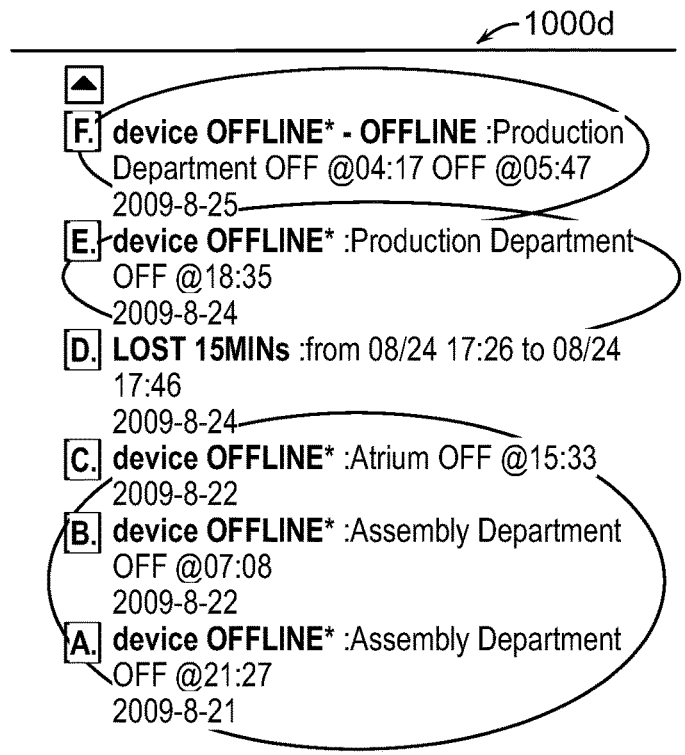
Figure 3:
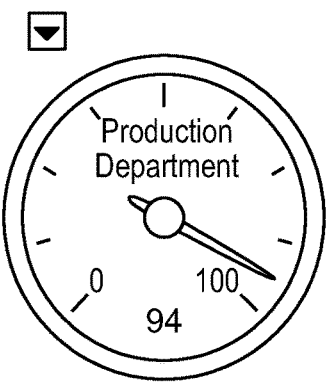

The technology further enables the detection of a device level performance compromise. FIG. 10D illustrates a screenshot 1000d of a low performance rate caused by at the device level. The low performance rate is easily detected by the trend graph associated with the flags.

Although the technology should detect this malfunction in case the device did not submit the data more then 4.5 times of its sampling interval (for example, sampling interval is 5 minutes), an additional monitoring feature can be utilized. To monitor this issue, the flag differentiate between the device is offline with appropriate offline code (65535) and offline without the offline code reporting. Once a device does not submit any data more then 4.5 times of its sampling interval, the flag "device OFFLINE*" is shown as orange circle on list in FIG. 10C. As illustrated, the symbol "*" means that the offline code is submitted with the malfunction of device. If the offline code is not submitted with the associated with the behavior, the flag "OFFLINE" is denoted on the flag with the reporting time as noted as a red circle on FIG. 10D. In some examples, the technology can utilize any type of code and/or flag. In this example, the sever side codes and/or flags are developed with python and client side code is written in either java script or visual basic.

The technology further enables the reconstruction of a data packet route on the wireless mesh network. When a certain device's performance rate is lower than other devices' performance rate, the cause could be either a device's physical issue or a wireless mesh network issue. The technology reconstructs a possible representation of the wireless mesh network at the specific date when the issue occurred, and the representation of the wireless mesh network enables a decision regarding the cause of the issue. The route can be followed from the first hop device at the latest updated information at the certain time or certain period when the issue occurred.

Figure 10E:
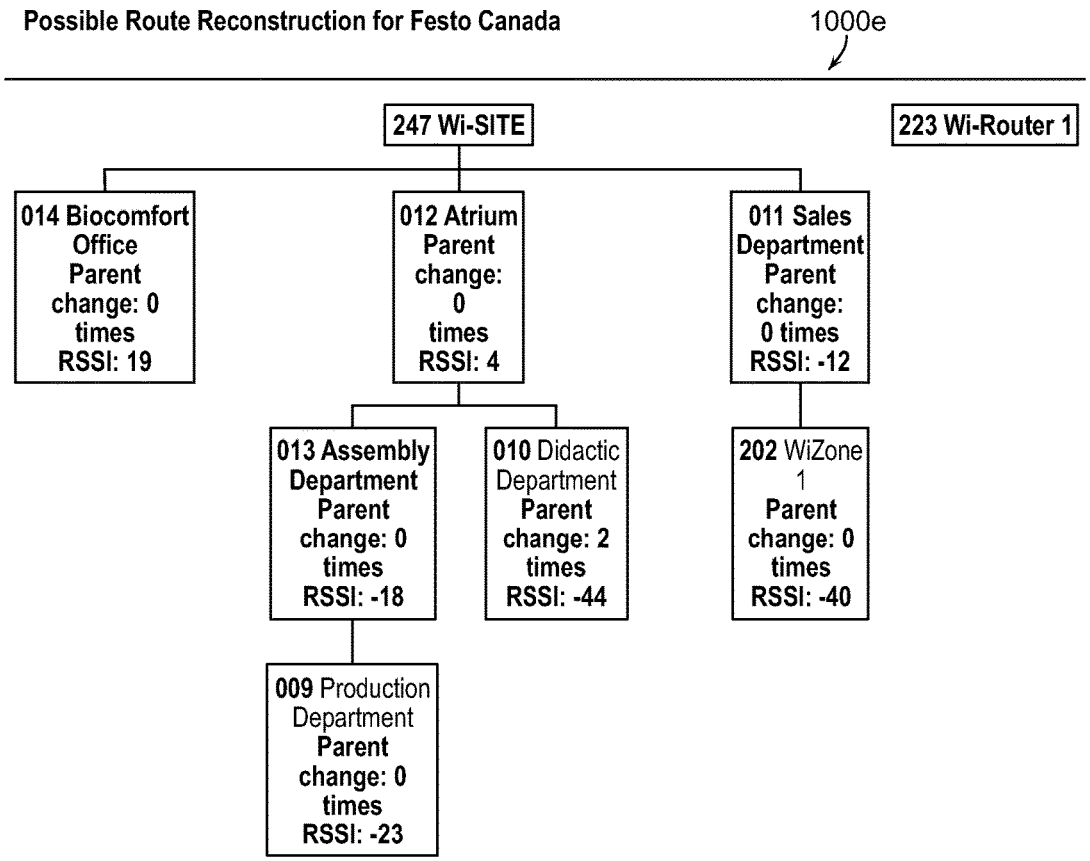

FIG. 10E illustrates a screenshot 1000e of a possible route of at a set time on August 25$^{th}$ and the table illustrates the network information from August 24$^{th}$ to August 25$^{th}$. The technology can search the latest reporting information for entered date-time and estimates the route when the issue occurred and any related historical information. As illustrated in FIG. 10E, the red device represents that the device is offline at the requested time on August 25$^{th}$. If the device is suffering with the weak link before going down (offline), the device would have a lower number of the RSSI or weak link (low RSSI) on its route to the wireless gateway. However, as illustrated in FIG. 10E, the next link of the offline device (in this example, the production department) is the assembly department. The assembly department was a stable link that did not change during the problematic period and had a relative strong RSSI (−28). To accommodate recognition of a weak link, a device with a weak signal (RSSI<−35) is noted with orange color. Also, a number of a device's link recovery is presented on the table as well as a number of parent devices that the device had during the time period.

Figures 1, 10F:
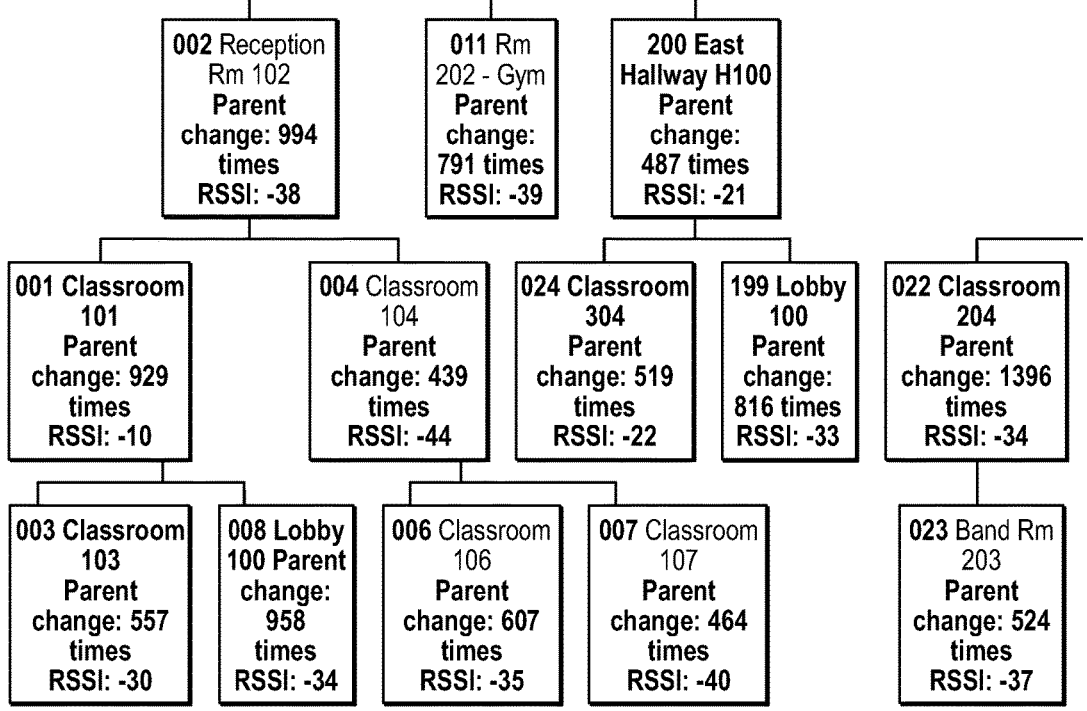
Figures 3, 10F:
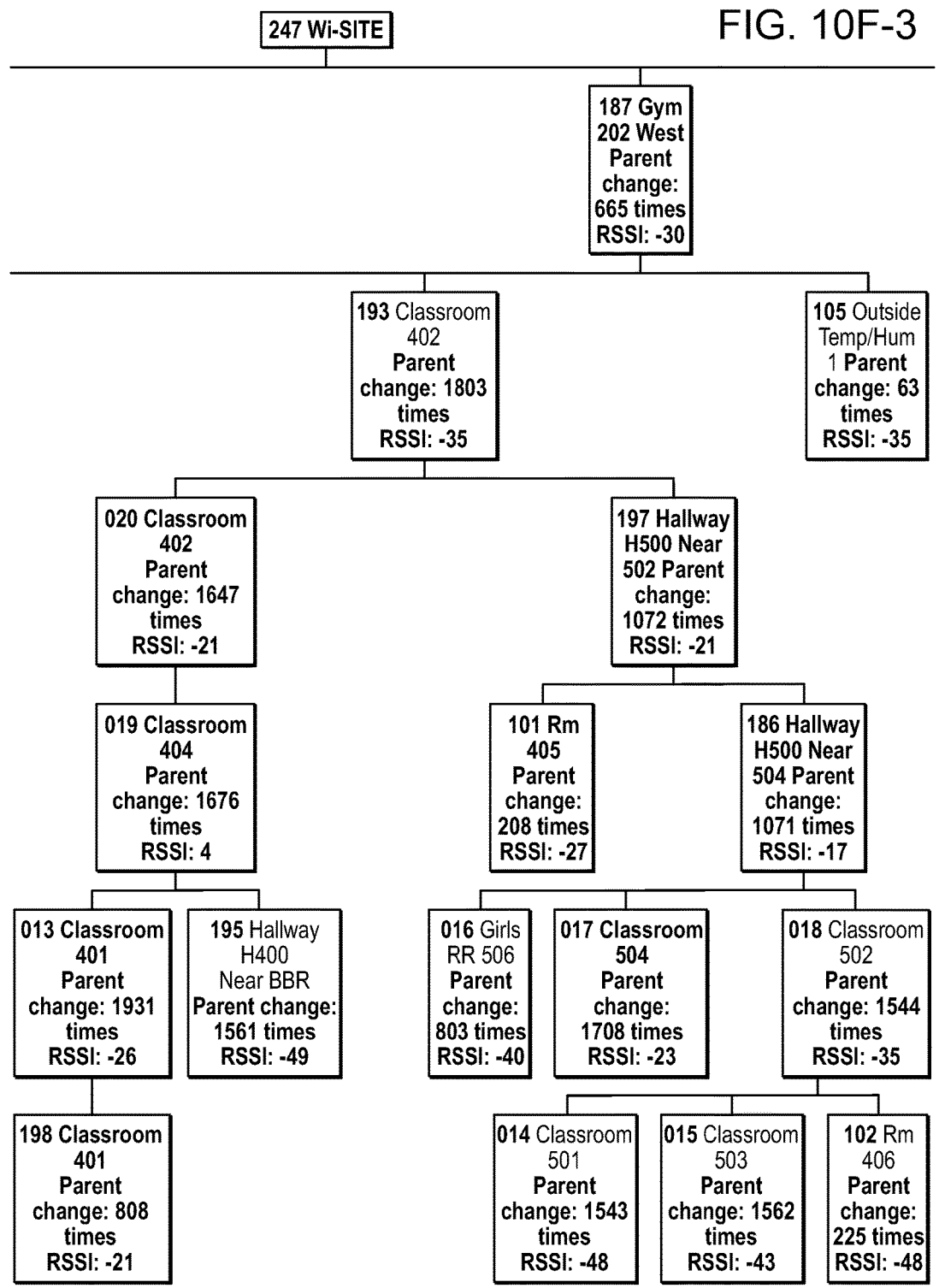
Figures 5, 10F:
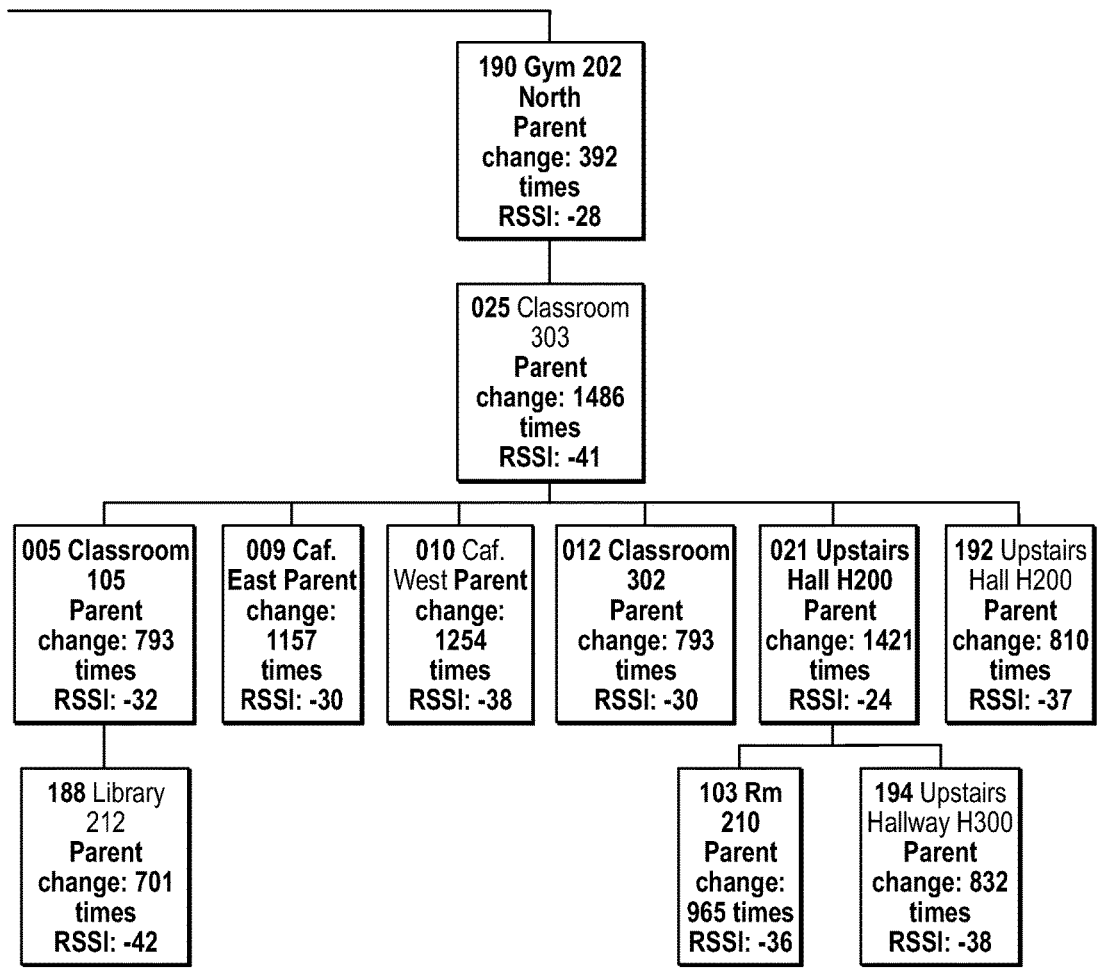

FIG. 10F illustrates a screenshot 1000f of an analysis of the route for the Cherokee site for 1055 days of data and with 29 devices. The technology can be used for the analysis during this broader period as illustrated in FIG. 10F. The technology can quickly analysis the data and display the analysis in less than 2 seconds. Also, this report can prioritize the weak links that need to be replaced and/or boosted. If there is a weak link noted as yellow that has many children nodes, the weak link can be treated as important compared with the end nodes.

The technology further enables the dynamic change of a network route in the wireless mesh network route. By creating a report for the each site based on the request, the technology enables the reconstruction of possible routes for specific timeframes as often as a user needs the routes reconstructed. Once the add date request is submitted, the server side simulation creates the documents on the server and a user can change each requested route by choosing the date on the table.

In some examples, the user can choose an exact time for reconstruction of the route (e.g., by second, by minute, etc.). If the device has ever been offline amongst selected dates, the device is noted as yellow as illustrated in a screenshot 1000g of FIG. 10G. If the device is currently offline, the device is shown as red. If the device is not yet installed or has not yet submitted any data, the device is shown as violet.

In other examples, the user can select the date on the table illustrated in FIG. 10G to view the reconstructed route for the selected date/time. A screenshot 1000h of FIG. 10H (current route), a screenshot 1000i of FIG. 10I (at 20090825 20:05), a screenshot 1000j of FIG. 10J (at 20090824 20:05), and a screenshot 1000k of FIG. 10K (at 20090823 20:05) illustrate reconstructed routes for selected dates/times. The visualization of specific reconstructed route at the specified times effectively helps the comparison of the route during the unstable situation versus stable situation.

Weather Impact on Building Energy Modeling

The technology can generate weather data to determine the weather impact on a building energy model. The generated weather data can be utilized to control one or more energy devices via a wireless mesh network. The technology utilizes hourly valid weather data to determine a building's energy consumption. However, most public accessible data from weather stations has missing gaps that range from a few hours to a few days. The technology can generate hourly weather data for a specific year by utilizing weather data from a plurality of weather stations (e.g., 1743 weather stations in US, 125 weather stations in the Southern US, etc.). The missing data can be interpolated from the received data.

In some examples, if less than 4 hours is missing, the missing data is linearly interpolated. The missing data can be linearly interpolated based on any predetermined time period (e.g., under 2 hours, under 6 hours, etc.) and/or based on a dynamically generated time period (e.g., under 30% of the total data, etc.).

In other examples, if more than 4 hours is missing, the missing data generated by averaging the temperature data from three weather stations' within a 50 miles radius of the building. The missing data can be generated via the other weather data based on any predetermined time period (e.g., over 2 hours, over 6 hours, etc.) and/or based on a dynamically generated time period (e.g., over 40% of the total data, etc.).

In some examples, if there is not enough measured available data from nearby weather stations, average data for a time period (e.g., fifteen years' typical weather data from the National Renewable and Energy Lab (NREL), average weather data for a region, etc.) can be used to fill the missing data.

Figure 11:
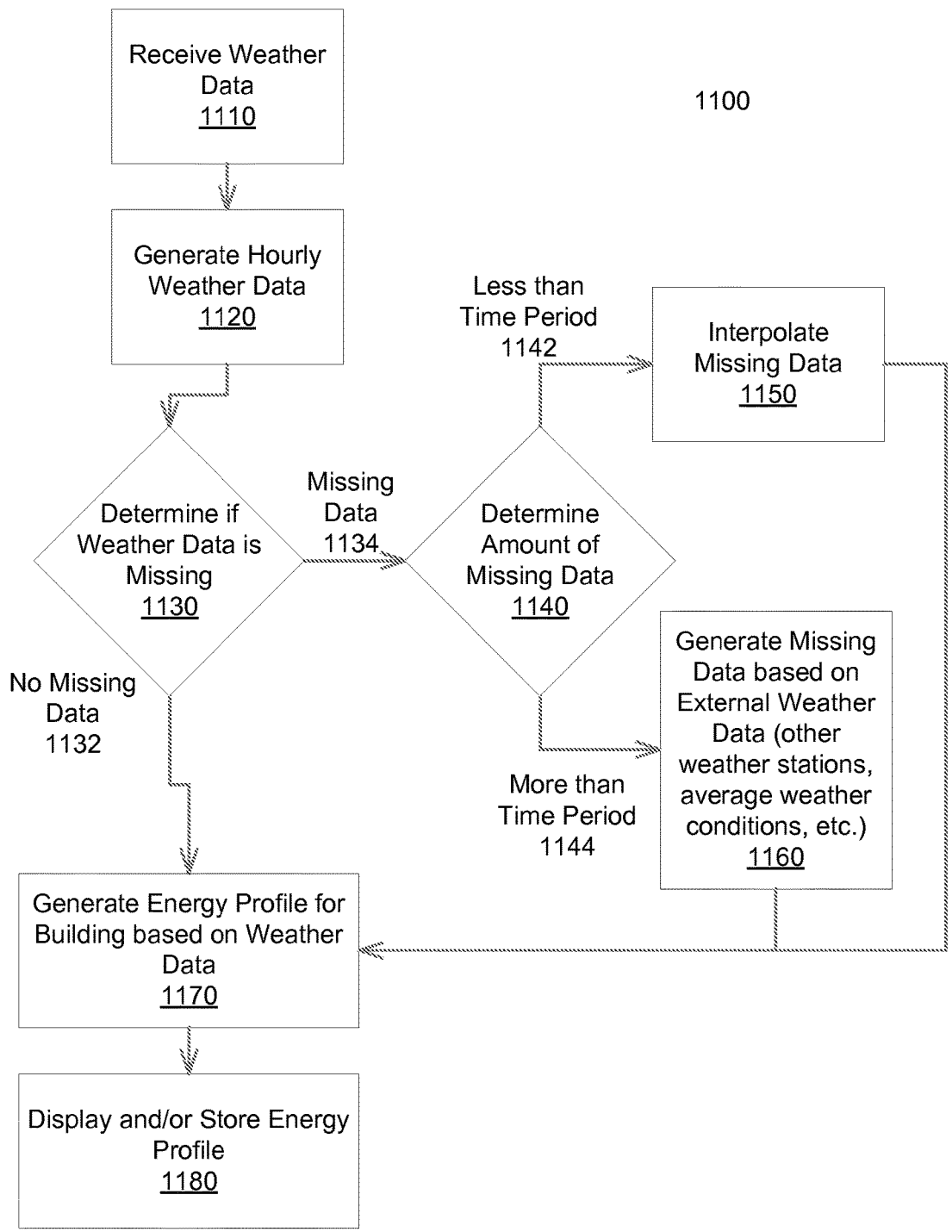
FIG. 11 illustrates a flowchart depicting an exemplary process for generating missing data.

FIG. 11 illustrates a flowchart 1100 depicting an exemplary process for generating missing data utilizing, for example, the management server 150 of FIG. 1. The management server 150 receives (1110) weather data from one or more weather sensors and/or one or more storage devices. The management server 150 generates (1120) hourly weather data based on the received weather data. The management server 150 determines (1130) if weather data is missing. If weather data is missing (1134), the management server 150 determines (1140) the amount of missing data. If the amount of missing data is less than (1142) a time period (e.g., set time period, dynamically determined time period, etc.), the management server 150 interpolates (1150) the missing data. If the amount of missing data is more than (1144) the time period, the management server 150 generates (1160) the missing data based on external weather data. If no weather data is missing (1132), after the interpolation (1150), or after the generation (1160), the management server 150 generates (1170) an energy profile for the building based on the weather data. The management server 150 displays and/or stores (1180) the energy profile. Although FIG. 11 describes the flowchart 1100 as being processed by the management server 150, any of the modules, devices, and/or servers described herein can process the flowchart 1100 and/or any variations thereof.

Once the data set is ready (i.e., a complete simulation), the technology can generate valid data (e.g., in less than 5 sec, depending on the number of files) for use in the energy management system. The technology can generalize the energy consumption of a building based on the location and/or can compare the effectiveness of changing an operating schedule for heating and/or cooling equipment.

Generally, energy transfer for a building's climate control operation system is heavily dependent on the temperature difference between inside and outside of the building. The temperature difference is determined by the building's location and building's thermal mass and/or the building envelop (e.g., doors, windows, insulation, building materials, etc.). Although the amount of energy consumed is expected to balance the building's energy interaction with the environment, the actual energy consumed by a building's climate control is different based on heating, ventilation, and air conditioning (HVAC) equipments efficiency.

The energy management system of the technology does not change any condition that could impact the building's energy condition except for the equipment operating schedule and the set temperature. Thus, the energy consumption of a building can be estimated for before and after any modifications to the operating schedule and/or the set temperature in via of the weather data of the location.

Although it is generally challenging to quantify the amount of energy required for building, the generalization enables the relative change to be expressed in terms of percentile with or without the energy management system. This comparison can be confirmed by Newton's law of cooling. $(Q=h \times A \times \Delta T)$.

Based on the valid hourly weather data on the specific location, the technology can simulate the energy consumption of one or more buildings before the energy management solution is implemented and after. Further, the technology can determine the aggregated temperature difference between building's outside and inside temperatures. In other examples, the technology is fast and can calculate the conditions in seconds and can generate reports in 1-5 seconds.

The technology can further estimate the thermal mass of an existing building based on monitoring results. For example, based on the monitoring or control temperature data inside a building, the building's thermal mass ($h \times A$) can be predicted. Further, if data is present for a period when the climate control system is not operated, such as weekend or night, the thermal mass can be calculated. The thermal mass provides information regarding the amount of energy which is required to heat/cool the building.

Light Detection Sensors

The technology can further be utilized for the location detection of objects using array of multiple wireless mesh enabled light sources on the ceiling or wall. Light has different characteristics than radio in achieving communications. In some examples, light can have a lower power than radio. In other examples, light is contained by barriers that radio can overcome. Also, there is generally more regulation and congestion for radio frequencies.

The technology can utilize distributed light sources with different modulations to communicate information with "smart objects" (e.g., a light sensor, a wireless device, etc.) and/or find locations of objects. The distributed light sources can be interconnected via the wireless mesh network.

Figure 12:
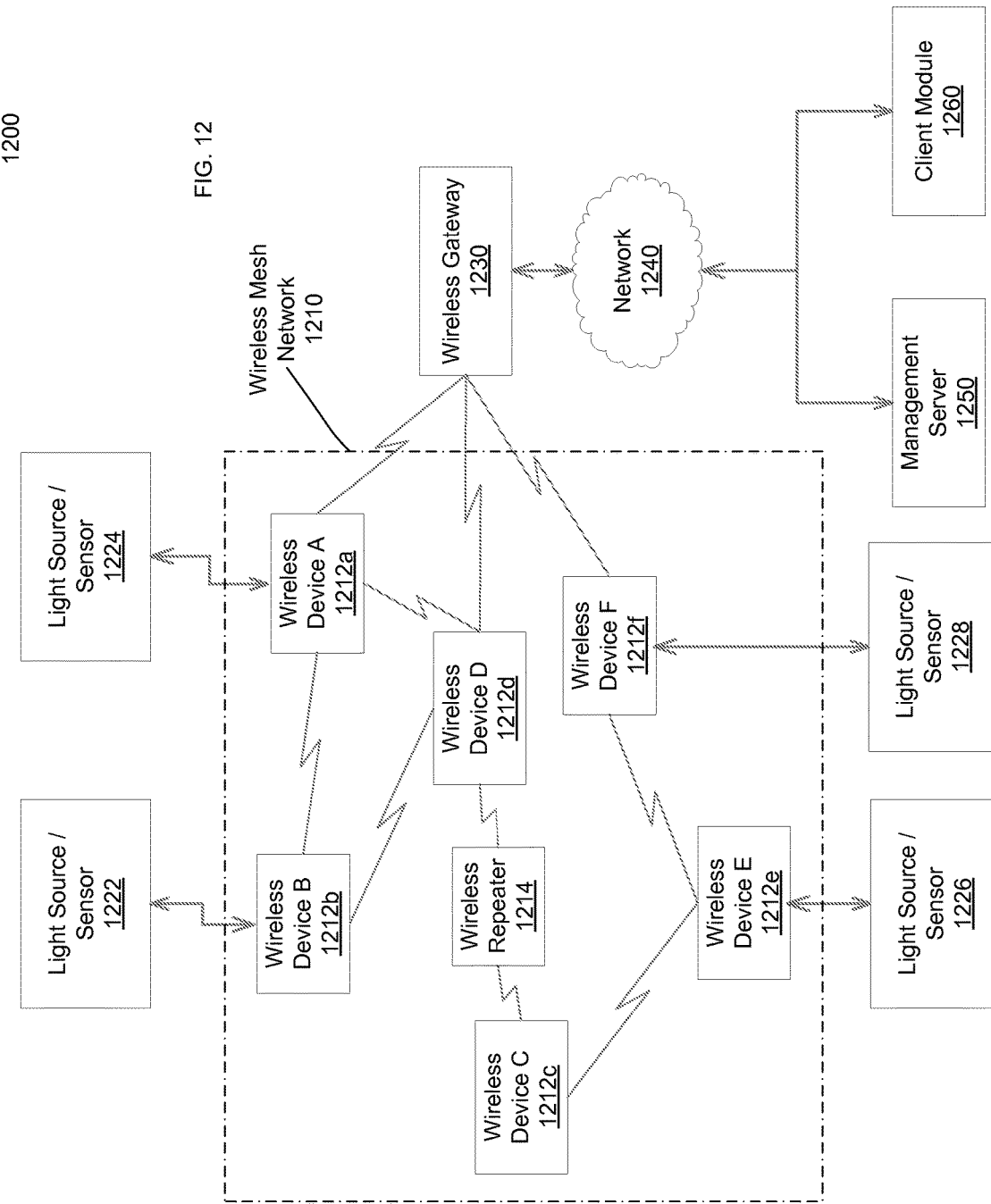
FIG. 12 illustrates an exemplary wireless mesh network with a plurality of light sensors and/or light sources.

FIG. 12 illustrates an exemplary wireless mesh environment 1200 with a plurality of light sensors and/or light sources 1222, 1224, 1226, and 1228. The wireless mesh environment 1200 includes a wireless mesh network 1210, wireless devices 1212a, 1212b, 1212c, 1212d, 1212e, and 1212f (generally referred to as 1212) that operate in the wireless mesh network 1210, a wireless repeater 1214, a wireless gateway 1230, a network 1240, a management server 1250, and a client module 1260. The wireless repeater 1214 forwards and/or routes communications between wireless device D 1212d and wireless device C 1212c via the wireless mesh network thereby extending the range of the wireless mesh network 1210. The wireless gateway 1230 connects the wireless mesh network 1210 to the management server 1250 via the network 1240. The management server 1250 communicates with the wireless devices 1212 via the network 1240 (e.g., the internet, local area network, etc.) and the wireless gateway 1230 and transmits data to one or more of the wireless devices 1212. The management server 1250 also receives information from the wireless devices 1212. The client module 1260 includes an interface utilized to manage the management server 1250 directly or remotely via the network 1240.

The light sensors and/or light sources 1222, 1224, 1226, and 1228 communicate with the management server 1250 via the wireless mesh network 1210, the wireless gateway 1230, and the network 1240. The light sensors and/or light sources 1222, 1224, 1226, and 1228 are connected, directly or indirectly, with the wireless devices B 1212b, A 1212a, E 1212e, and 1212f, respectively.

For example, on a semiconductor factory floor, the location of trays and carts can be tracked with accuracy by installing light sources/sensors (such as LED light) on ceilings and/or walls, as well as on or within equipment and objects. The positions of the light sensors can be fixed (e.g., mounted on a wall) or mobile (e.g., mounted on an assembly line). In this example, the light sources/sensors can communicate with each other via the wireless mesh network to communicate the location of the various light sources/sensors to a management server and/or other computing device.

As another example, mobile uses of the light sources/sensors can include semiconductor wafer carriers, tools, and/or other objects. For example, the technology can use similar modulation as CDMA and/or TDMA on multiple light sources, and a single receiver can identify the light sources by de-modulating the signals from the light sources. For example, each light source or a group of light sources can be assigned with a unique address and a unique frequency of on/off operation fast enough not to be visible to human eyes, and the receiver can identify the address of the light source or the group of light sources by identifying the specific on/off frequency of the light source. In another example, each light source or a group of light sources can carry a unique address and a unique on/off sequence or pattern that is fast enough not be visible to human eyes, and the receiver can identify the light source or the group of light sources by identifying the on/off sequence or pattern. The on/off sequence pattern of each light source of the group of light sources can also carry its location information or other contents. By using filtering and demodulating techniques, each receiver can identify the addresses of multiple light sources or multiple groups of light sources simultaneously. The receiver can also acquire the location information or the contents from the light sources or the groups of light sources. The receiver can also calculate light intensity from difference sources around the receiver, and use triangulation to determine location information. This location information of a receiver and the received contents can be sent to the base station via the wireless mesh network.

In some examples, the smart objects can communicate sensor information such as temperature, vibration, etc. The communication between the smart objects and/or other devices can be bi-directional to affect outputs and control.

The technology can utilize the light sources/sensors for factory automation. The light communications can apply where wires are impractical, costly, and/or prone to failure. The light communication provides alternative to wireless communications and/or can be combined with wireless communications. For example, the light communications can be between a robot arm and a robot end-effecter. As another example, the light communication can be between a workstation or equipment and a tool, a carrier, and/or a unit being worked.

Wireless Pest Control System

The technology can further be utilized for wireless pest control system (also referred to as a wireless mouse trap). Pest companies typically deploy bait boxes (costing about three dollars each to purchase and costing about one dollar and fifty cents to manufacturer) to provide periodic inspection services. A typical home could have twelve boxes. In the commercial sector there can be dozens to hundreds of boxes. For example, a baseball stadium (e.g., Fenway Park) could have two hundred or more boxes. Any large commercial buildings of interest including high rises, sports stadium, and food preparation buildings would need a large number of boxes to adequate cover the needed area. In particular, any building/location with trash are a real problem with respect to pests.

Figure 13:
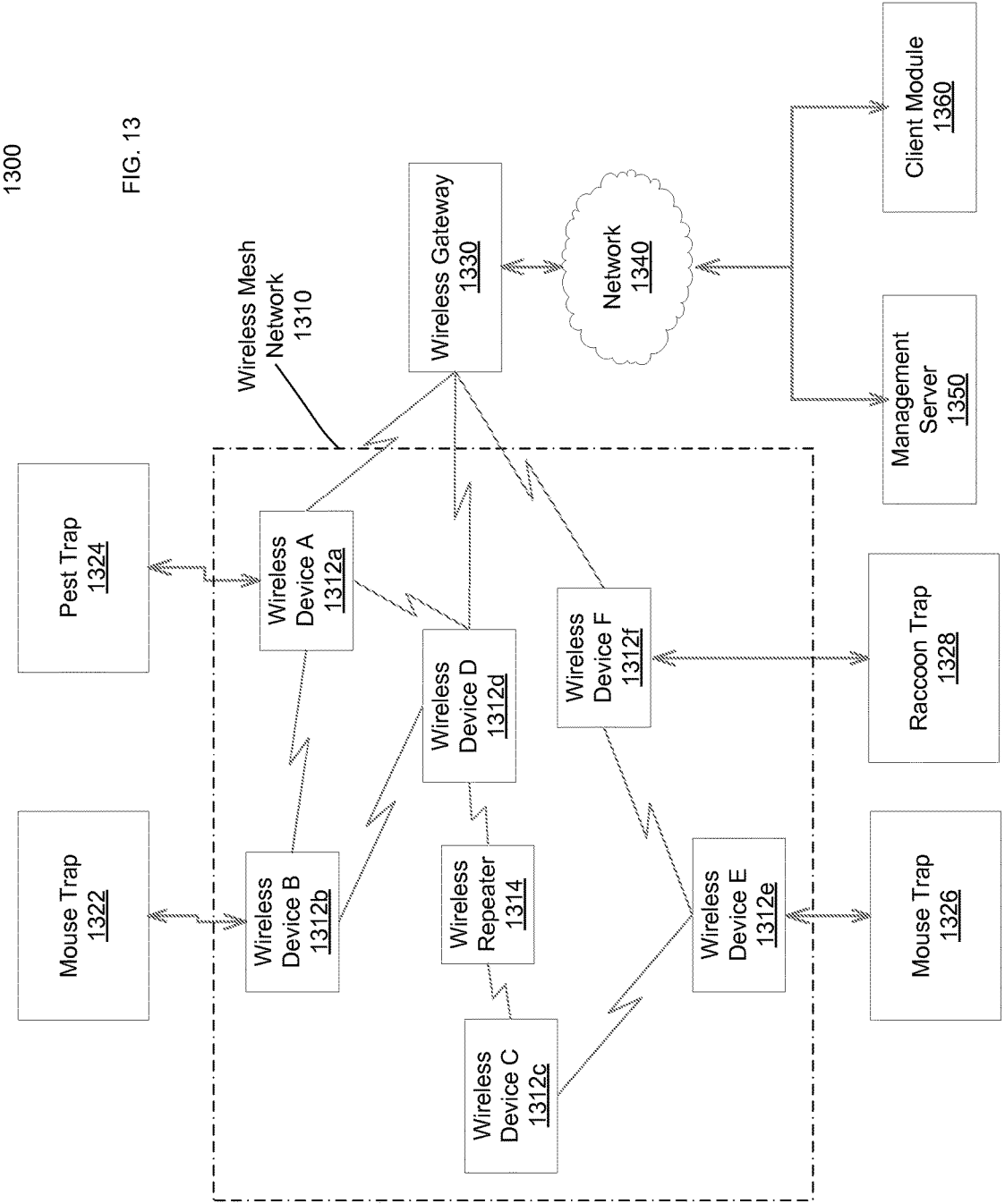
FIG. 13 illustrates an exemplary wireless pest control system.

FIG. 13 illustrates an exemplary wireless pest control environment 1300 with a mouse trap 1322, a pest trap 1324, a mouse trap 1326, and a raccoon trap 1328. The wireless pest control environment 1300 includes a wireless mesh network 1310, wireless devices 1312*a*, 1312*b*, 1312*c*, 1312*d*, 1312*e*, and 1312*f* (generally referred to as 1312) that operate in the wireless mesh network 1310, a wireless repeater 1314, a wireless gateway 1330, a network 1340, a management server 1350, and a client module 1360. The wireless repeater 1314 forwards and/or routes communications between wireless device D 1312*d* and wireless device C 1312*c* via the wireless mesh network thereby extending the range of the wireless mesh network 1310. The wireless gateway 1330 connects the wireless mesh network 1310 to the management server 1350 via the network 1340. The management server 1350 communicates with the wireless devices 1312 via the network 1340 (e.g., the internet, local area network, etc.) and the wireless gateway 1330 and transmits data to one or more of the wireless devices 1312. The management server 1350 also receives information from the wireless devices 1312. The client module 1360 includes an interface utilized to manage the management server 1350 directly or remotely via the network 1340.

The mouse trap 1322, the pest trap 1324, the mouse trap 1326, and the raccoon trap 1328 communicate with the management server 1350 via the wireless mesh network 1310, the wireless gateway 1330, and the network 1340. The mouse trap 1322, the pest trap 1324, the mouse trap 1326, and the raccoon trap 1328 are connected, directly or indirectly, with the wireless devices B 1212*b*, A 1212*a*, E 1212*e*, and 1212*f*, respectively.

A better mouse trap includes the wireless pest control system. The wireless pest control system includes one or more mouse traps that are inter-connected via a mesh network (mesh or end nodes).

The mouse traps can be, for example, battery powered bait boxes and/or can include a limit switch detector. The mouse traps can include wireless communication modules (e.g. radio, controller, antenna, etc.) and/or other types of sensors that could indicate the presence of a pest (e.g., motion sensor, weight sensor, laser beam sensor, etc.). The mouse traps can generally be referred to as wireless pest traps and can be designed to capture any type of pest (e.g., mouse, roach, rat, cat, raccoon, woodpecker, squirrel, etc.).

The wireless pest control system can be configured to monitor the network for boxes that have a pest (e.g., captured a pest, trapped a pest, etc.) and/or need replacement (e.g., bait exhausted, battery low, etc.). The wireless pest control system can further be configured to determine a location of the traps (e.g., detect movement of the traps, to verify that the traps are still on the property, etc.). Furthermore, the mouse traps and/or the wireless pest control system can be interconnected to an external management system (e.g., a home area network (HAN), an energy management system (EMS) network), for example, to leverage other infrastructure. In these examples, the data rate for the wireless pest control system could be low so that the battery life can be extended (e.g., single heartbeat every twenty-four hours, single heartbeat every week, etc.).

U.S. Pat. No. 7,522,563, issued on Apr. 21, 2009, is directed to various examples of the communication between wireless devices and is incorporated in its entirety hereto. U.S. Pat. No. 7,844,308, issued on Nov. 30, 2006, is directed to various examples of the communication between wireless devices and is incorporated in its entirety hereto.

Appendix A, U.S. Patent Application Publication No. 2009/0302996, published on Dec. 10, 2009, is directed to various examples of managing energy devices utilizing an energy profile and is incorporated in its entirety hereto.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be communication provided to the user in any form of sensory feedback (e.g., visual feedback, auditory feedback, or tactile feedback). Input from the user can, for example, be received in any form, including text, acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

Examples of communication networks include wired networks, wireless networks, packet-based networks, and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A wireless controller, comprising:
 a control module configured to manage at least one HVAC device controlled by a pneumatic pressure line via active room temperature feedback, and active pressure feedback from a piezoresistive sensor measuring pressure in the pneumatic pressure line, and command signals to a piezoelectric valve controlling the pneumatic pressure line based on one or more parts of an energy profile, the piezoelectric valve comprising a piezo bleed valve configured to decrease pressure in the pneumatic pressure line and a piezo feed valve configured to increase pressure in the pneumatic pressure line; and a network interface module configured to wirelessly transmit energy data to a management server and receive the one or more parts of the energy profile from the management server.

2. The wireless controller of claim 1, wherein the piezoelectric valve is configured to modify the pressure in the pneumatic pressure line proportionally to offset a difference in a measured temperature from a set-point according to the energy profile.

3. The wireless controller of claim 1, wherein the at least one energy device comprises a heating, ventilation, and air conditioning (HVAC) unit.

4. The wireless controller of claim 1, further comprising a pressure controller configured to modify a pressure in the pneumatic pressure line based on pressure feedback information, a thermal load in one or more controlled zones, one or more parts of the energy profile, or any combinations thereof.

5. The wireless controller of claim 1, further comprising a pressure controller configured to modify a pressure in the pneumatic pressure line proportionally to offset the difference in a measured temperature from a set-point temperature.

6. The wireless controller of claim 5, wherein the modification of the pressure in the pneumatic pressure line is an increase or decrease in the pressure in the pneumatic pressure line.

7. The wireless controller of claim 5, wherein the modification of the pressure in the pneumatic pressure line is an increase or decrease in the pressure directly proportionally to a positive or negative difference in the measured temperature from the set-point temperature.

8. The wireless controller of claim 1 further comprising:
a pressure controller configured to determine a temperature difference between a measured temperature and a set-point temperature; and
the controller further configured to adjust a branch line pressure based on a gain value, where the gain value is a ratio between a pressure change in the branch line and the temperature difference.

9. The wireless controller of claim 1 further comprising a pressure controller configured to modify a set point pressure of a pneumatic pressure line, wherein the set point pressure is a pressure that a branch line pressure is regulated at when a measured temperature agrees with a set point temperature.

10. The wireless controller of claim 1, further comprising the network interface module further configured to route and/or forward communication via a wireless mesh network.

11. The wireless controller of claim 1, further comprising the network interface module further configured to receive a configuration command, the configuration command comprises a modification to acting direction, a throttling range, set point pressure, gain, and dead band for one or more of the at least one energy device.

12. The wireless controller of claim 1, further comprising the control module further configured to replace an existing pneumatic thermostat.

13. The wireless controller of claim 1, wherein the piezoelectric valve requires no calibration over the operational life of the pressure controller.

14. The wireless controller of claim 1, wherein the network interface module is further configured to route and/or forward communication via a wireless mesh network.

15. The wireless controller of claim 14, wherein the control module is configured to forward high and low duty cycle commands through the network interface module via the wireless mesh network.

16. The wireless controller of claim 1, wherein the network interface module is further configured to receive a configuration command, the configuration command comprises a modification to acting direction, a throttling range, set point pressure, gain, and dead band for one or more of the at least HVAC device.

17. The wireless controller of claim 1, wherein the control module is configured to de-activate the wireless controller to enter a low power mode.

* * * * *